(12) United States Patent
Horvitz

(10) Patent No.: US 8,090,530 B2
(45) Date of Patent: Jan. 3, 2012

(54) COMPUTATION OF TRAVEL ROUTES, DURATIONS, AND PLANS OVER MULTIPLE CONTEXTS

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/691,775

(22) Filed: Jan. 22, 2010

(65) Prior Publication Data
US 2010/0185388 A1 Jul. 22, 2010

Related U.S. Application Data

(62) Division of application No. 11/428,216, filed on Jun. 30, 2006, now Pat. No. 7,739,040.

(51) Int. Cl.
*G01C 21/34* (2006.01)
(52) U.S. Cl. .......................... 701/204; 701/120; 701/209
(58) Field of Classification Search .................. 701/120, 701/204, 209
See application file for complete search history.

(56) References Cited

U.S. PATENT DOCUMENTS

| 5,444,442 A | 8/1995 | Sadakata et al. |
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |
| 5,606,695 A | 2/1997 | Dworzecki |
| 5,611,050 A | 3/1997 | Theimer et al. |
| 5,812,069 A | 9/1998 | Albrecht et al. |
| 5,812,865 A | 9/1998 | Theimer et al. |
| 5,822,712 A | 10/1998 | Olsson |
| 5,933,094 A | 8/1999 | Goss et al. |
| 5,955,974 A * | 9/1999 | Togawa .......................... 340/994 |
| 5,987,374 A | 11/1999 | Akutsu et al. |
| 6,026,375 A * | 2/2000 | Hall et al. ................... 705/26.43 |
| 6,047,260 A | 4/2000 | Levinson |
| 6,124,826 A | 9/2000 | Garthwaite et al. |
| 6,236,932 B1 | 5/2001 | Fastenrath |
| 6,240,364 B1 | 5/2001 | Kerner et al. |

(Continued)

FOREIGN PATENT DOCUMENTS
WO WO-9800787 A1 1/1998
(Continued)

OTHER PUBLICATIONS

[No Author Listed] Auto Route. htttp://www.microsoft.com/uk/homepc/autoroute/see/default.mspx. Last accessed on Mar. 1, 2006. 2006 Microsoft Corporation.

(Continued)

*Primary Examiner* — Mark Hellner
*Assistant Examiner* — Ari M Diacou
(74) *Attorney, Agent, or Firm* — Wolf, Greenfield & Sacks, P.C.

(57) ABSTRACT

A route planning system comprises a receiver component that receives a request for directions between a beginning point and a destination point. An analysis component analyzes a traffic system representation that varies as context varies and outputs expected amounts of travel time between the beginning point and the destination point for multiple contexts based at least in part upon the analysis. A method is described herein that includes techniques for searching over routes and trip start times simultaneously so as to identity start times and routes associated with maximal expected value, or equivalently minimum expected cost, given preferences encoded about one or more of the leaving time, the travel time, and the arrival time.

18 Claims, 17 Drawing Sheets

U.S. PATENT DOCUMENTS

| | | | |
|---|---|---|---|
| 6,259,988 B1 | 7/2001 | Galkowski et al. | |
| 6,282,486 B1 | 8/2001 | Bates et al. | |
| 6,298,302 B2 | 10/2001 | Walgers et al. | |
| 6,314,365 B1 | 11/2001 | Smith | |
| 6,317,686 B1* | 11/2001 | Ran | 701/210 |
| 6,353,398 B1 | 3/2002 | Amin et al. | |
| 6,381,522 B1* | 4/2002 | Watanabe et al. | 701/22 |
| 6,381,533 B1 | 4/2002 | Crane et al. | |
| 6,401,027 B1 | 6/2002 | Xu et al. | |
| 6,401,038 B2 | 6/2002 | Gia | |
| 6,445,968 B1 | 9/2002 | Jalla | |
| 6,466,232 B1 | 10/2002 | Newell et al. | |
| 6,480,783 B1 | 11/2002 | Myr | |
| 6,510,384 B2* | 1/2003 | Okano | 701/209 |
| 6,513,046 B1 | 1/2003 | Abbott, III et al. | |
| 6,549,915 B2 | 4/2003 | Abbott, III et al. | |
| 6,640,212 B1 | 10/2003 | Rosse | |
| 6,672,506 B2 | 1/2004 | Swartz et al. | |
| 6,704,645 B1 | 3/2004 | Beesley et al. | |
| 6,721,650 B2 | 4/2004 | Fushiki et al. | |
| 6,741,188 B1 | 5/2004 | Miller et al. | |
| 6,744,383 B1 | 6/2004 | Alfred et al. | |
| 6,747,675 B1 | 6/2004 | Abbott et al. | |
| 6,751,549 B1 | 6/2004 | Kozak | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,813,558 B1 | 11/2004 | Lapstun et al. | |
| 6,837,436 B2 | 1/2005 | Swartz et al. | |
| 6,842,877 B2 | 1/2005 | Robarts et al. | |
| 6,882,930 B2 | 4/2005 | Trayford et al. | |
| 6,909,380 B2 | 6/2005 | Brooke | |
| 6,970,131 B2 | 11/2005 | Percy et al. | |
| 6,983,139 B2 | 1/2006 | Dowling et al. | |
| 6,985,810 B2 | 1/2006 | Moitra et al. | |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,171,378 B2 | 1/2007 | Petrovich et al. | |
| 7,195,157 B2 | 3/2007 | Swartz et al. | |
| 7,385,501 B2 | 6/2008 | Miller et al. | |
| 7,418,340 B2* | 8/2008 | Kasai | 701/209 |
| 7,739,040 B2* | 6/2010 | Horvitz | 701/210 |
| 2001/0029425 A1 | 10/2001 | Myr | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0010610 A1 | 1/2002 | Jacobs et al. | |
| 2002/0010615 A1 | 1/2002 | Jacobs | |
| 2002/0032689 A1 | 3/2002 | Abbott et al. | |
| 2002/0044152 A1 | 4/2002 | Abbott et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0082771 A1 | 6/2002 | Anderson | |
| 2002/0082772 A1* | 6/2002 | Okano | 701/209 |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0103693 A1 | 8/2002 | Bayer et al. | |
| 2003/0018428 A1 | 1/2003 | Knockeart et al. | |
| 2003/0018521 A1 | 1/2003 | Kraft et al. | |
| 2003/0027558 A1* | 2/2003 | Eisinger | 455/414 |
| 2003/0046158 A1 | 3/2003 | Kratky | |
| 2003/0046401 A1 | 3/2003 | Abbott et al. | |
| 2003/0060979 A1 | 3/2003 | Andrews et al. | |
| 2003/0065442 A1 | 4/2003 | Touney | |
| 2003/0154476 A1 | 8/2003 | Abbott et al. | |
| 2003/0182052 A1 | 9/2003 | DeLorme et al. | |
| 2004/0059622 A1 | 3/2004 | Mueller | |
| 2004/0088107 A1* | 5/2004 | Seligmann | 701/204 |
| 2004/0102896 A1* | 5/2004 | Thayer et al. | 701/207 |
| 2004/0181495 A1 | 9/2004 | Grush | |
| 2004/0192351 A1 | 9/2004 | Duncan | |
| 2004/0201500 A1 | 10/2004 | Miller et al. | |
| 2005/0004757 A1 | 1/2005 | Neeman et al. | |
| 2005/0027444 A1 | 2/2005 | Kim | |
| 2005/0034078 A1 | 2/2005 | Abbott et al. | |
| 2005/0038596 A1 | 2/2005 | Yang et al. | |
| 2005/0049765 A1 | 3/2005 | Chetia et al. | |
| 2005/0234758 A1 | 10/2005 | Nishi | |
| 2005/0256754 A1 | 11/2005 | Nastacio | |
| 2005/0266858 A1 | 12/2005 | Miller et al. | |
| 2005/0267680 A1 | 12/2005 | Watanabe et al. | |
| 2005/0272442 A1 | 12/2005 | Miller et al. | |
| 2005/0288849 A1 | 12/2005 | Rothman et al. | |
| 2006/0019676 A1 | 1/2006 | Miller et al. | |
| 2006/0025925 A1* | 2/2006 | Fushiki et al. | 701/210 |
| 2006/0041379 A1 | 2/2006 | Brulle-Drews | |
| 2006/0161335 A1 | 7/2006 | Beinhaker | |
| 2006/0184314 A1 | 8/2006 | Couckuyt et al. | |
| 2008/0090591 A1 | 4/2008 | Miller et al. | |
| 2008/0091537 A1 | 4/2008 | Miller et al. | |
| 2008/0109153 A1 | 5/2008 | Gueziec | |
| 2008/0161018 A1 | 7/2008 | Miller et al. | |

FOREIGN PATENT DOCUMENTS

| | | |
|---|---|---|
| WO | WO-9854682 A1 | 12/1998 |
| WO | WO-0163451 A2 | 8/2001 |
| WO | WO-0193070 A2 | 12/2001 |
| WO | WO-2004021306 A2 | 3/2004 |
| WO | WO-2005036471 A1 | 4/2005 |

OTHER PUBLICATIONS

[No Author Listed] Fastcommute. http://home.earthlink.net/~fastcommute/. Last accessed on Mar. 1, 2006.

[No Author Listed] Take a Free Trip on Auto-Pilot. http://www.freetrip.com/. Last accessed Mar. 1, 2006. 2 pages.

[No Author Listed] TriMet Transit Tracker Implementation. Innovations in Public Transit. Jan. 4, 2005. 7 pages.

[No Author Listed] "Workshop on Wearable Computing Systems," Aug. 19-21, 1996.

Ashbrook et al., Enabling Ad{Hoc Collaboration Through Schedule Learning and Prediction. http://www-static.cc.gatech.edu/fac/Thad.Starner/p/031_20_Activity/ch_mobihoc-2002.pdf. Last accessed on Mar. 2, 2006. 4 pgs.

Barros, Activities as Behaviour Aspects. http://lglwww.epfl.ch/workshops/uml2002/papers/barros.pdf. Last accessed on Mar. 3, 2006. 6 pages/.

Billinghurst et al., An Evaluation of Wearable Information Spaces, Proceedings of the Virtual Reality Annual International Symposium, 1998, 8 pages.

Billinghurst et al., Wearable Devices: New Ways to Manage Information, IEEE Computer Society, Jan. 1999, pp. 57-64.

Billinghurst, Research Directions in Wearable Computing, University of Washington, May 1998, 48 pages.

Bolla, A new model for network traffic forecast based on user's mobility in cellular networks with highway stretches. International Journal of Communication Systems. Sep. 22, 2004. pp. 911-934. vol. 17, Issue 10. John Wiley & Sons, Ltd.

Chen et al., A Survey of Context-Aware Mobile Computing Research, Dartmouth Computer Science Technical Report, 2000, 16 pages.

Doherty et al., The Development of a Unified Modeling Framework for the Household Activity-Travel Scheduling Process. Traffic and Mobility: Simulation-Economics-Environment, eds. W Briton, F. Huber, M. Schreckengerg, and H. Wallentowitz. pp. 35-56. Berlin: Springer.

Edelkamp et al., Route planning and map interference with global positioning traces. Computer Science in Perspective. 2003. pp. 128-151. Springer-Verlag New York, Inc.

Fawcett et al., Adaptive Routing for Road Traffic. IEEE Computer Graphics and Applications. May/Jun. 2000, pp. 46-53. vol. 20, No. 3.

Franzese et al., Traffic Simulation Application to Plan Real-Time Distribution Routes. Proceedings of the 2002 Winter Simulation Conference. 2002. pp. 1214-1218.

Goldberg et al., Computing the shortest path: A* search meets graph theory (2005) In Proc. 16th ACM-SIAM Symposium on Discrete Algorithms. http://www.cs.berkeley.edu/~chrishtr/papers/msr-tr-2004-25.ps.gz/.

Haigh et al., Exploiting Domain Geometry in Analogical Route Planning. Journal of Experimental and Theoretical AI, 1997. pp. 509-541. vol. 9, No. 4.

Handley et al., Leanring to Predict the Duration of an Automobile Trip. Proceedings of the Fourth International Conference on Knowledge Discovery and Data Mining. 1998, pp. 1-5, New York.

Hart et al., A Formal Basis for the Heuristic Determination of Minimum Cost Paths. IEEE Transactions on Systems Science and Cybernetics SSC4 (2): pp. 100-107. http://ai.sanford.edu/~nilsson/OnlinePubs-Nils/PublishedPapers/astar.pdf.

Harter et al., "A Distributed Location System for the Active Office", IEEE Network, 1994 pp. 62-70.

Horvitz et al., Attention-Sensitive Alerting in Computing Systems, Microsoft Research, Aug. 1999.

Horvitz et al., In Pursuit of Effective Handsfree Decision Support: Coupling Bayesian Interference, Speech Understanding, and Understanding, and User Models, 1995, 8 pages.

International Search Report dated Sep. 29, 2003 for PCT Application Serial No. 00/20685, 3 pages.

Joachims, Text categorization with support vector machines: learning with many relevant features, Machine Learning, European Conference on Machine Learning, Apr. 21, 1998 pp. 137-142.

Krumm et al., The Microsoft Multiperson Location Survey. Aug. 2005, pp. 1-4. Microsoft Research.

Kurtz et al., Map Navigation Experiment. http://www.itl.nist.gov/iaui/vvrg/nist-icv/experiments/mapnav/mapnav.html. Last accessed Mar. 1, 2006. 3 pages.

Lam, Comparison of two non-parametric models for daily traffic forecasting in Hong Kong. Journal of Forecasting. Feb. 27, 2006. 2 pages. John Wiley & Sons, Ltd.

Losee, Jr., Miniminizing Information Overload: the ranking of electronic messages, Journal of Information Science 15, Elsevier Science Publishers B.V. 1989, pp. 179-189.

Meister et al., Generating daily activity schedules for households unsing Genetic Algorithms. 5th Swiss Transport Research Conference. Mar. 9-11, 2005. 26 pages. Monte Verita/Ascona.

Oda et al., Evaluation of Measured Travel Time Utilizing Two-way Communication in UTMS. Third World Congress on Intelligent Transport Systems. 1996. Orlando, Florida.

Ostergren et al., Road Talk: A Roadside Location-Dependent Audio Message System for Car Drivers. Journal of Mobile Multimedia. Feb. 25, 2005. pp. 47-61. vol. 1, No. 1. Rinton Press.

Rabiner, A Tutorial on Hidden Markov Models and Selected Applications in Speech Recognition. Proceedings of the IEEE. Feb. 1989. vol. 77, No. 2. pp. 257-286.

Rhodes, "The Wearable Remembrance Agent: A System for Augmented Memory," *Proceedings of the First International Symposium on Wearable Computers* (ISW '97), Cambridge, MA, Oct. 13-14, 1997.

Rhodes, Remembrance Agent: A continuously running automated information retrieval system, The Proceedings of The First International Conference on The Practical Application of Intelligent Agents and Multi Agent Technology, 1996, pp. 487-495.

Rhodes, The Wearable Remembrance Agent: A System for Augmented Memory. Personal Technologies Journal Special Issue on Wearable Computing, 1997, 12 pages.

Schilit et al, Disseminating Active Map Information to Mbile Hosts, IEEE Network, 1994, pp. 22-32, vol. 8—No. 5.

Schilit et al., Context-Aware Computing Applications, In Proceedings of the Workshop on Mobile Computing Systems and Applications, Dec. 1994, pp. 85-90.

Schilit et al., Customizing Mobile Applications, Proceedings USENIX Symposiumon Mobile and Location Independent Computing, Aug. 1993, 9 pages.

Schilit et al., The ParcTab Mobile Computer System, IEEE WWOS-IV, 1993, 4 pages.

Schilt, A System Architecture for Context-Aware Mobile Computer, Columbia University, 1995, 153 pages.

Schwartz, Microsoft Research MapPoint 2002. Directions Magazine. Apr. 24, 2001. pp. 1-4. Directions Media. Glencoe, IL.

Smith et al., Meeting Real-Time Traffic Flow Forecasting Requirements with Imprecise Computations. Computer-Aided Civil and Infrastructure Engineering. May 2003. pp. 201-213. vol. 18, No. 3. Blackwell Publishing.

Spreitzer et al., "Providing Location Information in a Ubiquitous Computing Environment," SIGOPS '93, 1993, pp. 270-283.

Spreitzer et al., Architectural Considerations for Scalable, Secure, Mobile Computing with Location Information, In the 14th International Conference on Distributed Computing Systems, Jun. 1994, pp. 29-38.

Spreitzer et al., Scalable, Secure, Mobile Computingh with Location Information Communications of the ACM, Jul. 1993, 1 page, vol. 36—No. 7.

Starner, Wearable Computing and Contextual Awareness, Massachusetts Institute of Technology, Jun. 1999, 248 pages.

Theimer et al., Operating System Issue for PDAs, In Fourt Workshop on Workstation Operating Systems, 1993, 7 pages.

Want, Active Badges and Personal Interactive Computing Objects, IEEE Transactions on Consumer Electronics, 1992, 11 pages, vol. 38—No. 1.

Want et al., The Active Badge Location System, ACM Transactions on Information Systems, Jan. 1992, pp. 91-102, vol. 10—No. 1.

Weiser, Some Computer Science Issues in Ubiquitous Computing, Communications of the ACM, Jul. 1993, pp. 75-84, vol. 36—No. 7.

Weiser, The Computer for the 21st Century, Scientific American, Sep. 1991, 8 pages.

* cited by examiner

COMPUTATION OF TRAVEL ROUTES, DURATIONS, AND PLANS OVER MULTIPLE CONTEXTS

RELATED APPLICATIONS

This Application claims the benefit under 35 U.S.C. §120 of U.S. application Ser. No. 11/428,216, entitled "COMPUTATION OF TRAVEL ROUTES, DURATIONS, AND PLANS OVER MULTIPLE CONTEXTS" filed on Jun. 30, 2006, which is herein incorporated by reference in its entirety.

BACKGROUND

Computer-driven route planning applications are utilized every day to aid users in locating points of interest, such as particular buildings, addresses, and the like. Additionally, in several existent commercial applications users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a city, state, and/or country, proximity of the point of interest to major freeways, proximity of the point of interest to a specific city, and the like. In some applications, satellite images can be utilized to provide users with additional detail regarding a particular geographic location or region. For example, a prospective purchaser of a house can obtain an overhead satellite image of the house, thereby enabling the prospective purchaser to view lines of occupation, proximity of the house to other adjacent houses, and other information that may be pertinent to the user.

Furthermore, conventional computer-implemented mapping applications often include route planning applications that can be utilized to provide users with directions between different locations. Pursuant to an example, a user can provide a route planning application with a beginning point of travel and an end point of travel (e.g., beginning and ending addresses). The route planning application can include or utilize representations of roads and intersections and one or more algorithms to output a suggested route of travel. These algorithms can output routes depending upon user-selected parameters. For instance, a commercial route planning application can include a check-box that enables a user to specify that she wishes to avoid highways. Similarly, a user can inform the route planning application that she wishes to travel on a shortest route or a route that takes a least amount of time (as determined by underlying algorithms). Over the last several years, individuals have grown to increasingly rely on route planning applications to aid them in everything from locating a friend's house to planning cross-country road trips.

Route planning applications are also no longer confined to desktop computers. Rather, several automobiles are now equipped with standard mapping functionality, wherein the automobiles include graphical displays on a console to provide mapping data and directions to a user. Oftentimes, a compact disk or other storage medium that includes data to enable utilization of route-planning functionality must be purchased and loaded prior to use of the route planning application. As road conditions change, such as speed limits, number of lanes, etc., updates can be provided. Automobiles with GPS functionality (or other location identifying functionality) can additionally include real-time directions, wherein directions are provided to users of the automobile while they travel.

These route planners are fairly reliable in connection with details such as posted speed limits, location of one-way streets, and related information. However, conventional applications that include route-planning functionality make assumptions regarding state of roads. With more specificity, today's route planning applications are built around assumptions of constancy and universality, such that optimal routes provided by the applications are independent of time of day, day of week, and detailed user preferences. In actuality, however, these assumptions do not hold. For example, in many instances, a best route between two points during rush hour in a metropolitan area is not an optimal route at midnight between the same two points. Conventional route planning applications, however, do not take such context into account when providing routes for users. Conventional route planning applications also have an ability to estimate an amount of time that traveling a route will require. This determination can be based at least in part upon data relating to distances of road segments and posted speed limits associated therewith. Again, however, the route planning applications are based upon the assumption of constancy, meaning that estimated travel time does not change even if time of travel or other context alters.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to a route planning application that can determine estimated travel times given varying contexts. In contrast to conventional route planning applications, which assume that estimated travel times are constant regardless of time of day, day of week, weather conditions, and the like, the systems and methods described herein facilitate estimating travel time between a beginning point and a destination point over varying contexts. Pursuant to one example, an individual can request directions between a beginning point and an end point, and estimated travel times between the two points can be generated for multiple times that travel can be begun. It is understood, however, that estimated travel times can be generated for different weather conditions, different days of the week, etc.

To facilitate computing estimated travel times, a traffic system representation can be accessed, wherein the representation alters as context alters. Pursuant to an example, the traffic system representation can be or include a weighted graph, where nodes represent intersections and edges represent road segments therebetween. The nodes and edges can be weighted, where the weights correspond to average travel speeds associated with intersections and road segments that are represented by the nodes and edges. The weights can then vary as context varies, thus more accurately representing traffic flow within a traffic system. For instance, commuters in a metropolitan area are fully aware that it takes more travel time to travel certain road segments during rush hour when compared to traveling the same road segments at midnight on a weekend. The traffic system representation can be analyzed with respect to various contexts, and estimated travel times between a beginning point and a destination point can be output based at least in part upon the analysis.

More generally, flows at road segments can be represented by probability distributions over flows and these probability distributions can be a function of contextual observations such as time of day, day of week, calendar information, flows seen at earlier times, and flows in other parts of the traffic system. Probabilistic forecasting models can be trained, wherein the trained forecasting modes one of multiple forecasting methods that take current flows across a traffic system and compute forecasts about future flows on the traffic system. Thus, predictions for future flows can be targeted at different times in the future. Beyond the flows, the times until particular states are reached can be predicted, such as the time until a flow becomes significantly slowed or until a jammed region of the traffic system will likely open up to flow at some level of motion. One of several discriminative versus generative statistical methods can be employed for prediction and forecasting over time. These methods include statistical classifiers such as support vector machines, the use of Bayesian structure search within the realm of Bayesian machine learning, the learning and usage of dynamic Bayesian networks and related Hidden Markov Models, Continuous Time Bayesian networks, and families of time-series methods such as those employing Bayesian models, and models known as ARMA and ARIMA forecasting models.

In accordance with another aspect, estimated travel time can be updated in real time as a user travels over a route. For such applications, statistical methods can consider as inputs for both training and real-time reasoning real-time inferences, the observations reported by sensors, in addition to contextual information mentioned earlier. For example, a portable device can include multiple sensors which enable location, velocity, acceleration, and/or the like to be determined in real-time. A traffic system representation can be analyzed in light of the real-time data, and an estimated amount of travel time remaining can be provided to the user.

Also, travel times can be computed for a trip ahead of time, in a manner that takes into consideration estimates of the time that it will take to get to each segment of a trip. In such an approach, the estimated time required to progress through each segment of a route is computed based on a consideration of the flows at each portion of the route at the time when the driver is expected to arrive at those downstream routes, considering the time of day and day of week and traffic flows throughout a system at the starting time and, optionally, at later times during a trip. The probabilistic forecasting methods can be used to provide such flows at later times for the computation of the overall travel time associated with a route starting at some particular time.

As such, "optimal" routes can be provided between the same two points given varying context, thereby providing the user with directions that minimize travel time (while considering driving preferences of the user) for various departure times. For instance, the user can provide a beginning point and a destination point and request directions between such points. The systems/methods described herein can, for instance, determine directions between the two points that will result in minimized driving time for various departure times. Therefore, a first set of directions can correspond to a first departure time, a second set of directions can correspond to a second departure time, etc.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
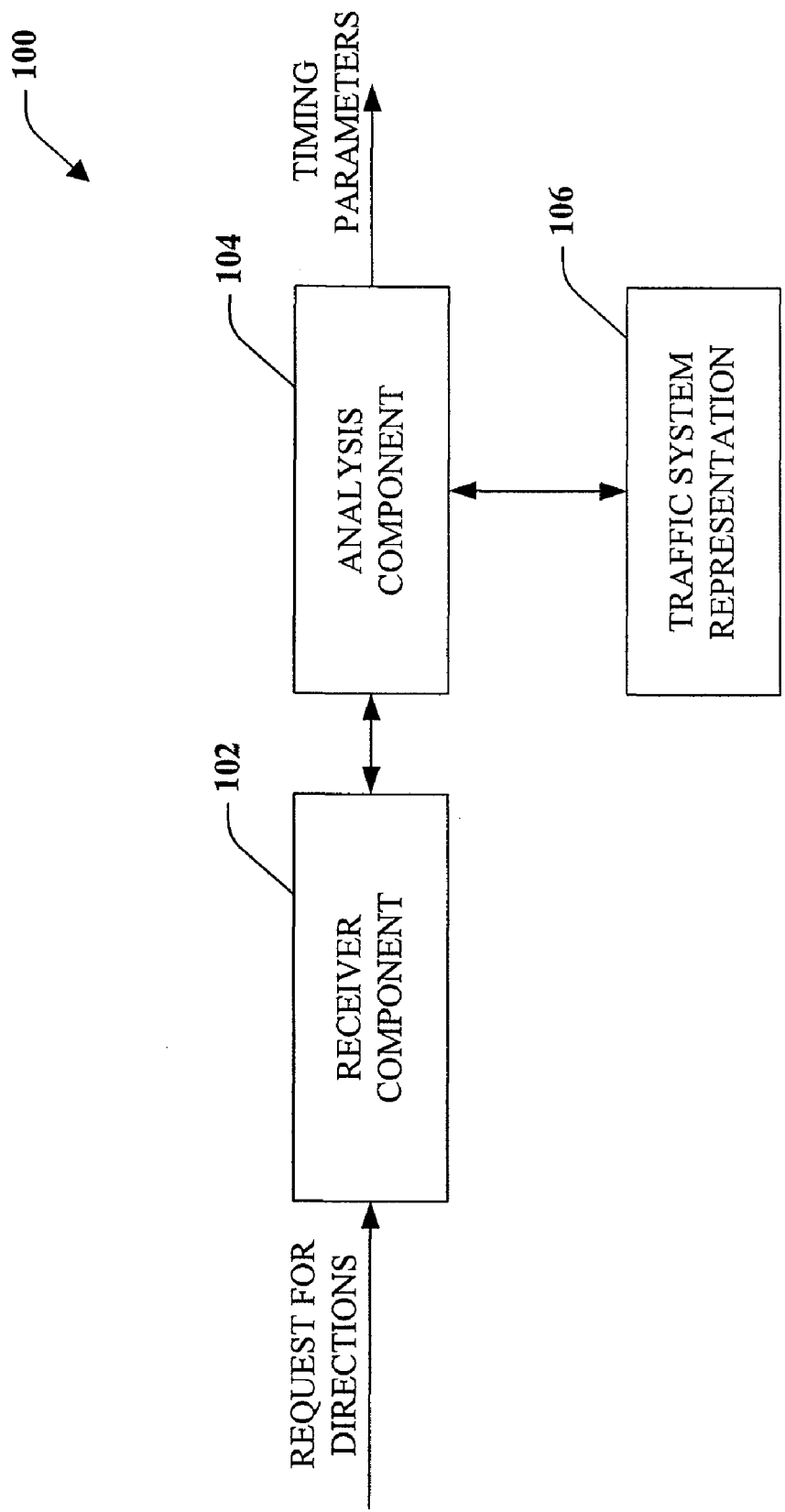
FIG. 1 is a high-level block diagram of a system that facilitates determining estimated travel times between two points given multiple contexts.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

For purposes of explanation and not limitation, the systems/methods are generally described herein with respect to users traveling in a traffic system or desirably traveling in a traffic system (e.g., in automobiles). It is to be understood and appreciated, however, that concepts underlying the following description of the figures can be applied to other areas where timing parameters are important, such as bus lines, airport security, walking on campus between classes, cooking (e.g., multi-tasking by trying to make several dishes using a single oven/stove), and other similar areas. Therefore, the following description is not intended to be limited to the field of traffic and/or directions.

Referring now to FIG. 1, a system 100 that determines timing parameters relating to a route within a traffic system and/or one or more tasks is illustrated. The system 100 can reside within a server, be distributed across several servers, and/or reside within a client. The system 100 includes a receiver component 102 that receives a request for directions from a user. The request can be provided through utilization of a web browser and templates associated therewith, through a microphone, keypad, or any other suitable input device. The request for directions can include at least two points; a beginning point and a destination point of a journey. The points can correspond to addresses, cities, monuments, regions, landmarks, airports, or any other suitable point.

The receiver component 102 is communicatively coupled to an analysis component 104 that is employed to determine timing parameters associated with the request for directions. In more detail, the analysis component 104 can determine timing parameters associated with the request for directions that are based at least in part upon when the journey will be undertaken. In a specific example, a user can request directions from a beginning point and an ending point, and the analysis component 104 can output timing parameters such as "The journey will take approximately thirty minutes of driving time if the journey begins in five minutes. The journey will take approximately forty five minutes if the journey begins in one hour. The journey will take approximately twenty minutes if the journey begins in five hours." Thus, the analysis component 104 enables a user to minimize drive time by providing different expected travel times given different times with respect to starting the journey. For instance, the analysis component 104 can inform a user when the journey would be expected to take a least amount of time.

To determine the timing parameters, the analysis component 104 can access a traffic system representation 106, which can be a context-sensitive representation. In other words, in contrast to conventional traffic system representations utilized by route planning applications, the traffic system representation 106 can alter as context changes. In a particular example, the traffic system representation can be and/or include a weighted graph, where nodes of the graph represent intersections, edges represent road segments between the intersections, and weights associated therewith represent average travel speeds for the road segments/intersections. The weights can alter as context alters. For instance, a first weight can be provided for a road segment at a first time of day and a second weight can be provided to the same road segment at a second time of day. Thus, the traffic system representation 106 can represent how traffic flows alter given different times of day (e.g., rush hour versus non-rush hour), days of week (e.g., weekday versus weekend), weather conditions (e.g., raining versus sunny), and other suitable contextual data. Still further, the representation 106 can include representations of traffic flows at certain road segments, wherein such flows can be probability distributions over flows and these probability distributions can be a function of contextual observations such as time of day, day of week, calendar information, flows seen at earlier times, flows in other parts of the traffic system, etc.

To determine when a user would make the journey in a least amount of time, the analysis component 104 can provide different contexts to the traffic system representation 106, thereby altering weights of nodes and edges therein. The analysis component 104 can then locate a route between the two provided points with a lowest total weight, and can determine an expected time based at least in part upon the total weight. Pursuant to an example, this can be done for increments of time. For instance, the analysis component 104 can provide expected times for the journey for each thirty minute time increment. The analysis component 104 can then cause the timing parameters to be displayed to the user in any suitable order (e.g., from departure times that are expected to require a least amount of time to departure times that are expected to require the most amount of time). The analysis component 104 can also take into account preferences about time for leaving, travel time, and arrival time in relationship to target arrival times, e.g., per events starting, and suggest a departure time and ideal route that maximizes a user's expected utility, including the user's risk preference (risk seeking or risk aversion).

Furthermore, the analysis component 104 can output time ranges with respect to an expected time for a journey given different times that the journey will be undertaken. Additionally, the analysis component 104 can output probabilities with respect to travel times. Pursuant to one example, the analysis component 104 can output that, if the user begins the journey in an hour, there is an eighty percent probability that the journey will take between twenty five and thirty five minutes.

These probabilities can be based upon historic data as well as current state of a traffic system (e.g., as determined from one or more sensors, traffic reports on web pages or radio stations, . . . ). Further, the analysis component 104 can output a mean time or any other suitable timing information associated with the requested directions. Therefore, a user requesting directions can determine with some degree of certainty how long a trip will take as context changes. As stated above, while described with respect to traffic, the concepts underlying the system 100 can be applied to various applications. For instance, the traffic system representation 106 can be manipulated to represent bus lines, drive through lines, walking areas, time associated with cooking meals, etc.

With more detail with respect to the traffic system representation 106, flows (e.g., a manner in which traffic is moving or expecting to move) at road segments can be represented by probability distributions over flows and these probability distributions can be a function of contextual observations such as time of day, day of week, calendar information, flows seen at earlier times, and/or flows in other parts of the traffic system. Probabilistic forecasting models can be trained, wherein the models employ one of multiple forecasting methods that take current flows across a traffic system and compute forecasts about future flows on the traffic system, where predictions for future flows can be targeted at different times in the future. Beyond the flows, the times until particular states are reached can be predicted by the analysis component 104, such as the time until a flow becomes significantly slowed or until a jammed region of the traffic system will likely open up to flow at some level of motion. One of several discriminative or generative statistical methods can be employed for prediction and forecasting over time. These methods include statistical classifiers such as support vector machines, the use of Bayesian structure search within the realm of Bayesian machine learning, the learning and usage of dynamic Bayesian networks and related Hidden Markov Models, Continuous Time Bayesian Networks (CTBNs), and families of time-series methods such as those employing temporal Bayesian models, and models known as ARMA and ARIMA forecasting models.

Also, the analysis component 104 can utilize probabilistic models, including dynamic Bayes networks, continuous time Bayes networks, Hidden Markov models, and various time-series forecasting models to take histories and current states of traffic flows and project them into the future, considering those flows as well as potential contexts such as time of day, day of week, weather, etc. Such models can be used in connection with computing travel times for a trip ahead of time in a manner that takes into consideration estimates or predictions of the time it will take to get to each segment of a trip. In such an approach, the estimate/predicted time required to progress through each segment of a route (as determined by the analysis component 104) can be computed based upon a consideration of flows at each portion of the route at a time when the driver is expected to arrive at those downstream routes, considering the time of day and day of week and traffic flows (predicted or sensed) at a starting time and, optionally, at later times during a trip. Probabilistic forecasting methods employed by the analysis component 104 can be used to provide such flows at later times for computation of an overall travel time associated with a route starting at some particular time.

In connection with predicting the travel times, the analysis component 104 can reason about until major transitions in traffic flows, e.g. from a time that a road segment is jammed until the jam melts away into a free-flowing traffic flow). For instance, the analysis component 104 can predict expected travel times for routes at different starting times by considering the likelihood that each jammed segment will remain jammed or when it will open when it is reached as a driver as they progress over a route (and vice versa). Thus, the probability that each portion of a road segment will be jammed as a driver is expected to reach such segment can be determined, and such probability can be propagated forward for determining probabilities associated with states of a next road segment in a route. In other words, the analysis component 104 can compute mean times required for a route starting at a given time by considering cascades of probabilities and searching through all possibilities, considering the probabilities of each state and summing over all situations to compute an expected travel time. This computation can be completed for different feasible routes and different feasible starting times, and computation can be searched over to find an optimal starting time and route (given a context and/or observed real-time or recent situation). The analysis component 104 can consider various contextual events in undertaking the aforementioned computation, including occurrence of major events (e.g., sporting events, cultural events), weather, sensed and/or inferred traffic flows, accidents, traffic reports in natural language, closures, historical information, etc. The cascading search strategy can be utilized to compute actual driving times in different contexts and use of such as part of a search to identify best routes and/or best starting times and routes.

Still further, given different overall durations of travel times for various contexts, the analysis component 104 can reason about an optimal time to initiate travel between two or more points based on background statistics (e.g., historical data) and/or on real-time observations within a traffic system. For example, given certain statements in the request for directions, such as travel duration and arrival times, different starting times and routes can be generated with a consideration of such preferences. For example, a driver may state a need to arrive with a particular probability by a certain amount of time (or a cost of delayed arrival where cost starts to accrue at a particular time) and also state that driving time is desirably minimized. In another example, a user can provide a utility model that provides a cost of total driving time and of being late (or early) to an appointment and have an optimization system compute a best time to leave and a best route to take to minimize the expected cost to the user under uncertainty. For instance, a user may assert that they do not wish to leave on a route at times when leaving would allow them to arrive earlier on average because of likely clearing of traffic jams.

Numerous manners to express preferences that take as arguments such goals as total driving time, total driving distance, time until leaving for a trip, time until arriving, etc are contemplated and intended to fall under the scope of the hereto-appended claims. For instance, individuals may wish to express preferences about how much time they would like to have before a meeting or appointment starts, or make such assertions with a probabilistic inference. For instance, a driver may assert to a route planning system, "I would like to leave as late as possible yet arrive at a destination with at least thirty minutes to spare with a 90% chance of such occurring." More generally, people can value their current time, time before leaving for a trip, time while driving, and time after arrival with different values or different rates. Individuals may wish to assign a cost as a function of how near to the start of an event that they arrive, and also specify a model that indicates the cost of being late as a function of how late they arrive after a deadline such as a meeting starting point.

The system 100 (and other systems/methods described herein) can be utilized in various manners. For instance, the system 100 can be an alerting system that informs a driver as to when to leave while taking a trip. Additionally, the system 100 can be employed to generate recommendations that inform to perform a task rather than to start or continue a trip so as to make ideal use of the user's time (e.g., when there is a list of pending goals and waiting and/or getting other things done would be a better use of time than sitting in traffic). Additionally, advertisements can be sold and rendered to a user given timing information associated with a route (e.g., when it is best that a user starts a route later and can undertake a task that takes about the right time for traffic to become free-flowing). Still further, the system 100 can be utilized to generate recommendations for a time to start travel given a preference. Moreover, the system 100 can be utilized in connection with an alarm clock that has access to a user's appointments and can wake the person up later or earlier depending upon predicted traffic flows (based upon the analysis as described above).

In summary, the system 100 described herein can search for ideal routes between points as well as starting times between routes, and based upon context the analysis component 104 can identify candidates for both a route to travel over and a starting time that maximizes a user's expected utility and/or minimizes overall cost to a user. For instance, a Dykstra search algorithm, an A* search algorithm, and/or a variant thereof can be utilized to perform route planning while considering contextual events (e.g., time of day, day of week, month, weather, . . . and a start time or a range of start times where the user is expected to reach certain portions of a possible routes. The search can be performed for multiple start times, and the analysis component 104 can select an optimal start time and route by minimizing expected cost to the user.

The cost of traveling over a route at a certain start time with respect to a user can be a function of the start time (e.g., the amount of time that a user can use for a different task before departing), driving time, and expected time of arrival, including relation between arrival time to a time that a planned meeting or appointment is scheduled to begin. To this end, a utility (or cost model) can be considered by the analysis component 104, where utility can be a function of time available before departing, expected travel time, and expected time to arrive before/after a target arrival time). When there are uncertainties, the analysis component 104 consider probabilities of different traffic flows and arrival times in connection with minimizing the expected cost of a route with respect to the user.

Thus, a representation and manner for instantiating a representation of a user's preferences about time and travel are considered, both in the general case and for a certain task at hand. For instance, a system/interface (such as that shown with respect to FIG. 13) can receive statements about preferences regarding different times for leaving, cost of travel time, and time of arriving in relation to target arrival times (e.g., per events starting). These statements can be considered by the analysis component 104 in connection with determining an optimal journey start time and an ideal route, wherein such selection maximizes a user's expected utility or minimizes an overall expected cost to the user, including the user's risk preference (risk seeking or risk aversion).

Figure 2:
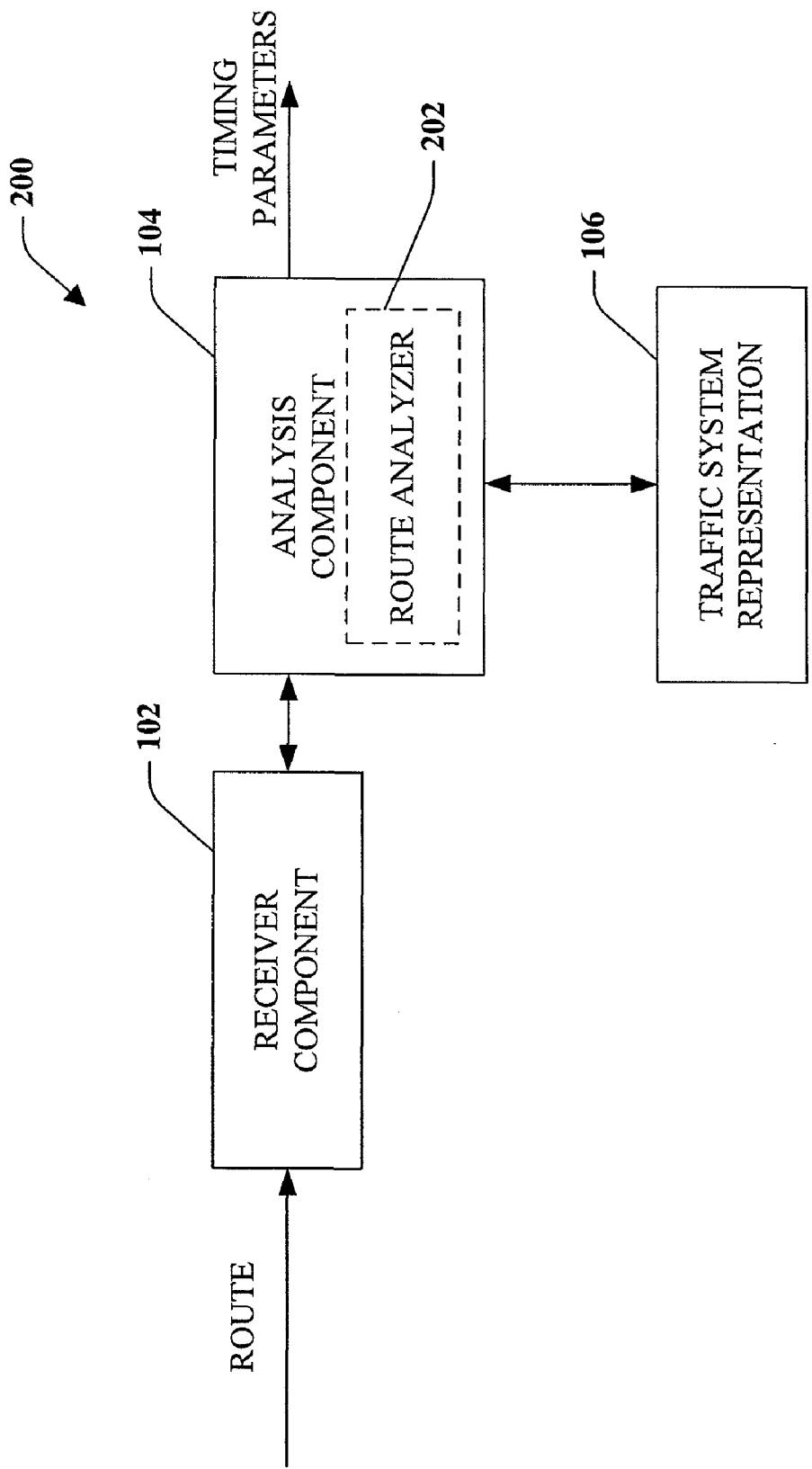
FIG. 2 is a block diagram of a system that facilitates determining estimated travel times for a particular route given multiple contexts.

Now turning to FIG. 2, a system 200 that facilitates determining timing parameters for a particular route is illustrated. The system 200 includes the receiver component 102 that receives a route from a user (rather than a request for directions). In this instance, the user may have a preferred route that they would rather take over all other available routes. Similarly, the user may have been provided directions from another individual, and they prefer not to deviate from the directions. The analysis component 104 can receive the route and provide it to a route analyzer 202. The route analyzer 202 can access the traffic system representation 106 and analyze the provided route in connection with changing contexts. For instance, as described above, the traffic system representation 106 can include a weighted graph with edges and nodes. The route can be mapped to the edges and nodes of the traffic system representation 106, and weights associated with the route can be analyzed given different contexts. Pursuant to one example, the route analyzer 202 can determine time parameters associated with the provided route over the course of several hours, wherein timing parameters are determined for each hour. Thus, the analysis component 104 can output timing parameters similar to the following: "If you leave now, the journey will take thirty minutes, if you leave in one hour, the journey will take forty-five minutes, if you leave in two hours, the journey will take twenty five minutes." Granularity and number of timing parameters associated with the route can be pre-determined by a user, determined through analysis of a device (not shown) that receives the timing parameters, or any other suitable manner for determining a number of timing parameters and how to display such parameters.

Figure 3:
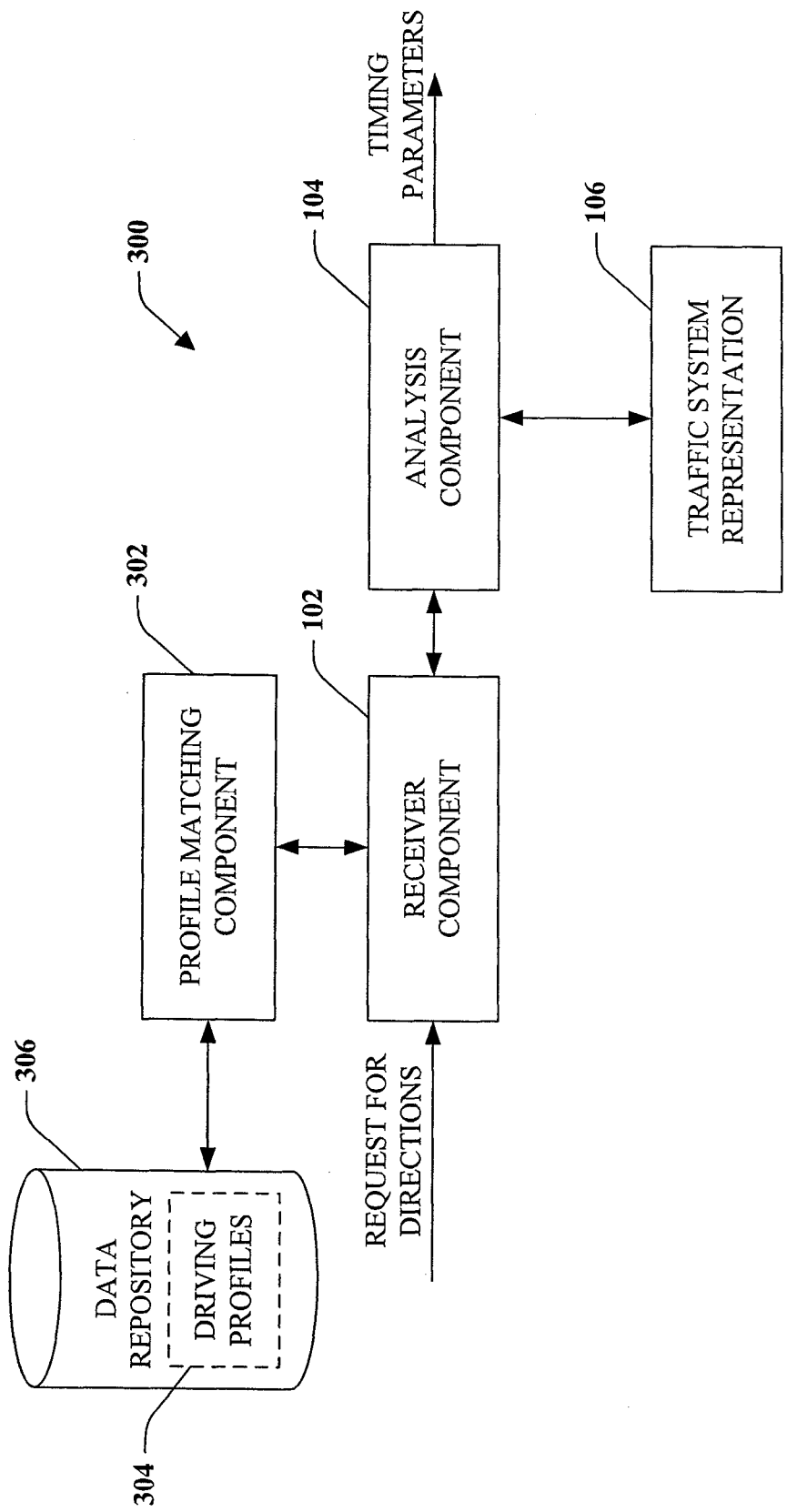
FIG. 3 is a block diagram of a system that determines estimated travel times between two points for multiple contexts based at least in part upon detailed driving preferences of a driver.

Referring now to FIG. 3, a system 300 that facilitates providing a user with timing parameters relating to a journey over various contexts is illustrated. The system 300 includes the receiver component 102 that receives a request for directions, wherein the directions can include a point of beginning and a destination point. The system 300 can additionally include a profile matching component 302, which can analyze driving preferences associated with the initiator of the request and map the driver to one or more driving profiles 304 within a data repository 306. The matching of the driver to a profile can be accomplished through a variety of means. For instance, sensors can be associated with the driver's vehicle, thereby enabling tracking of the driver's preferred routes (e.g., scenic routes over highway routes), average speeds given posted speed limits and traffic congestion, and the like. Data accumulated from the sensors can be analyzed in connection with profiling the driver. In another example, the driver may have previously provided answers to a questionnaire that is utilized to profile the driver. Still further, demographic information associated with the driver can be utilized to assign one or more of the profiles 304 to the driver. Therefore, it is understood that any suitable manner of profiling the driver with respect to their driving preferences is contemplated.

The driving profiles 304 can include profiles that are based upon demographics, monitored driving preferences, and the like. For example, drivers at or near retirement age may not wish to travel over highways associated with a significant amount of traffic congestion, and will increase travel time to avoid such highways. Drivers in their twenties, however, may be more willing to travel over such highways to reduce travel time. Drivers' typical areas of driving can also be indicative of driving preferences, as individuals from small towns may be less likely to travel over busy roads proximate to a large city than those who typically drive in large cities. Thus, numerous profiles can be defined that map to how different users prefer to drive.

The receiver component 102 can receive a profile that is associated with the driver, and the traffic system representation 106 can be updated based at least in part upon the profile assigned to the driver. For instance, a profile can be assigned to a driver that does not wish to travel over highways. Thus, merges and road segments that are associated with highways can be assigned a greater weight while road segments associated with scenic routes are provided a lower weight. The alteration of weights is beneficial when a user is not familiar with a region but still wishes to drive according to their preferences. Therefore, rather than the analysis component 104 locating a route that is associated with the least amount of travel time given different contexts, the analysis component 104 can determine a route that accords to user driving preferences and the request for directions. The analysis component 104 can then determine temporal parameters associated with a route that is customized for the initiator of the request over different contexts. For example, the analysis component 104 can output "If it is snowing and you depart in thirty minutes, your journey will be forty minutes. If it is not snowing and you depart in thirty minutes, your journey will be thirty minutes." Thus the analysis component 104 can output estimated travel times given a variety of different contexts.

Figure 4:
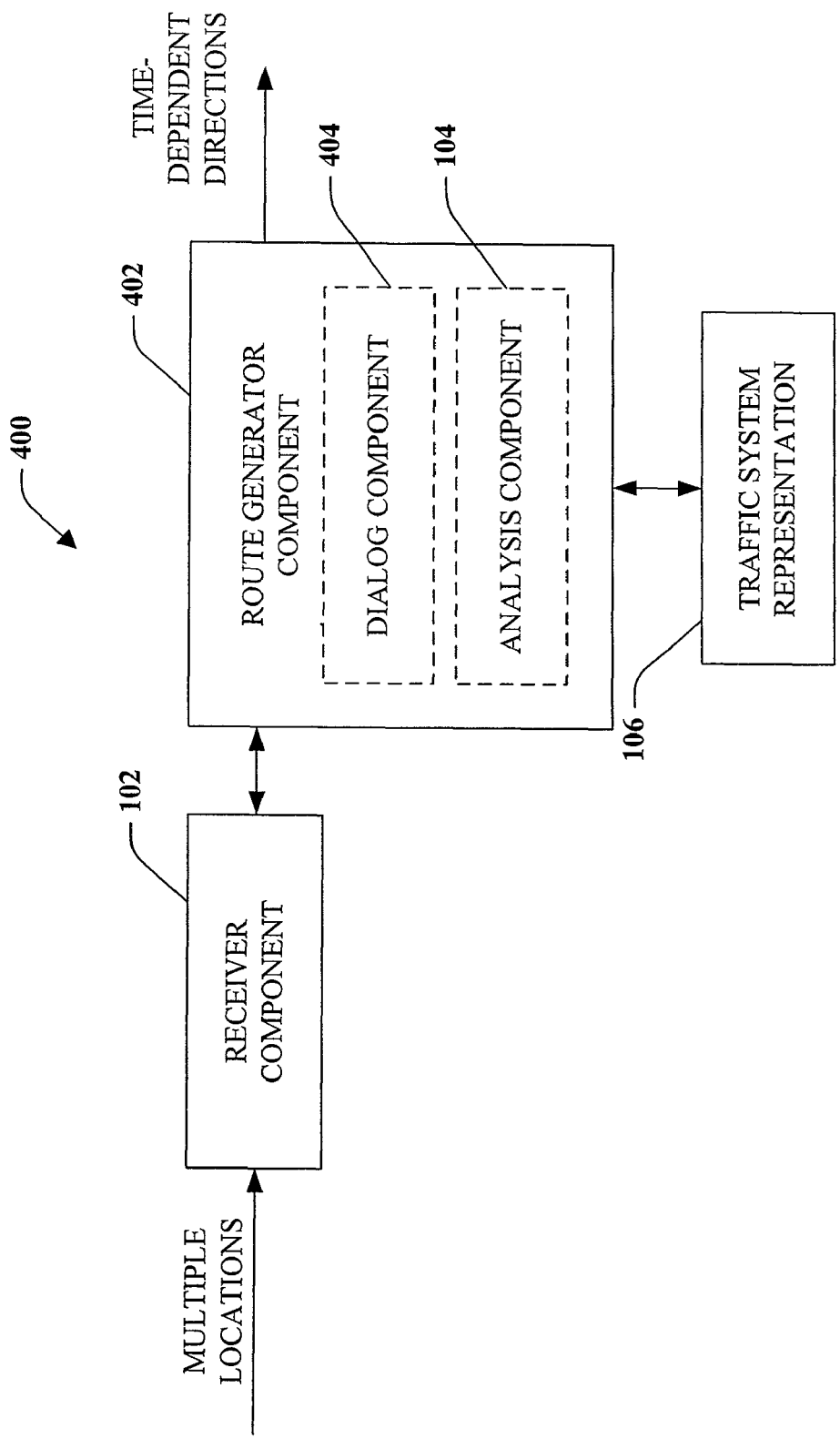
FIG. 4 is a block diagram of a system that determines a sequence with respect to traveling to multiple locations and determines estimated time of travel associated with the sequence.

Referring now to FIG. 4, a route planning system 400 that outputs timing information associated with routes as context changes is illustrated. The system 400 includes the receiver component 102. Rather than receiving a beginning point and end point, however, in this example system the receiver component 102 receives multiple locations, where order that the locations are to be visited may not be of importance. For example, an individual running errands can provide the receiver component 102 with multiple locations associated with the errands. For instance, an individual may need to go to a post office, a grocery store, a hardware store, and a school in one trip. The individual, however, may not be aware of a best sequence to visit the multiple locations.

A route generator component 402 can be communicatively coupled to the receiver component 102, and can be employed to generate optimal routes given different departure times. Pursuant to one example, the route generator component can include a dialog component 404 that undertakes a dialog with the user to obtain timing information relating to the input locations. For instance, the dialog component 404 can ask a user the hours of operation of each of the multiple locations (e.g., when they open for business and close). The dialog component 404 can additionally ask the user an amount of time the user expects to stay at each location. For instance, the user may expect to be at the post office for ten minutes and at the grocery store for an hour. Additionally or alternatively, a searching component (not shown) can be employed to automatically determine operating hours of a subset of locations being visited by the user. For example, web sites associated with the multiple locations received by the receiver component 102 can include hours of operations, and the search component can automatically determine such hours. Additionally, the route generator component 402 can output directions or a route to a user, including when the user should begin travel with a probability of arriving within a certain time range of an entered time, based upon costs to the user of arriving late at a point of destination.

The timing information relating to the multiple locations can then be provided to the analysis component 104, which accesses the traffic system representation 106 to determine a best sequence to visit the multiple locations (given timing information provided by way of the dialog component 404), routes between the locations, and expected travel time of the routes (individually and/or in totality). Pursuant to a particular example, the route generator component 402 can output "If the journey begins in a half hour, the journey will be approximately four hours, and the locations should be visited in the following order: Location A, Location B, Location C. If the journey begins in two hours, the journey will be approximately four and a half hours, and the locations should be visited in the following order: Location C, Location A, Location B." It is understood that this is but one example of operation of the system 400, wherein such example is provided only for illustrating operation of the system 400 (and is not intended to limit the scope of the claimed subject matter).

Figure 5:
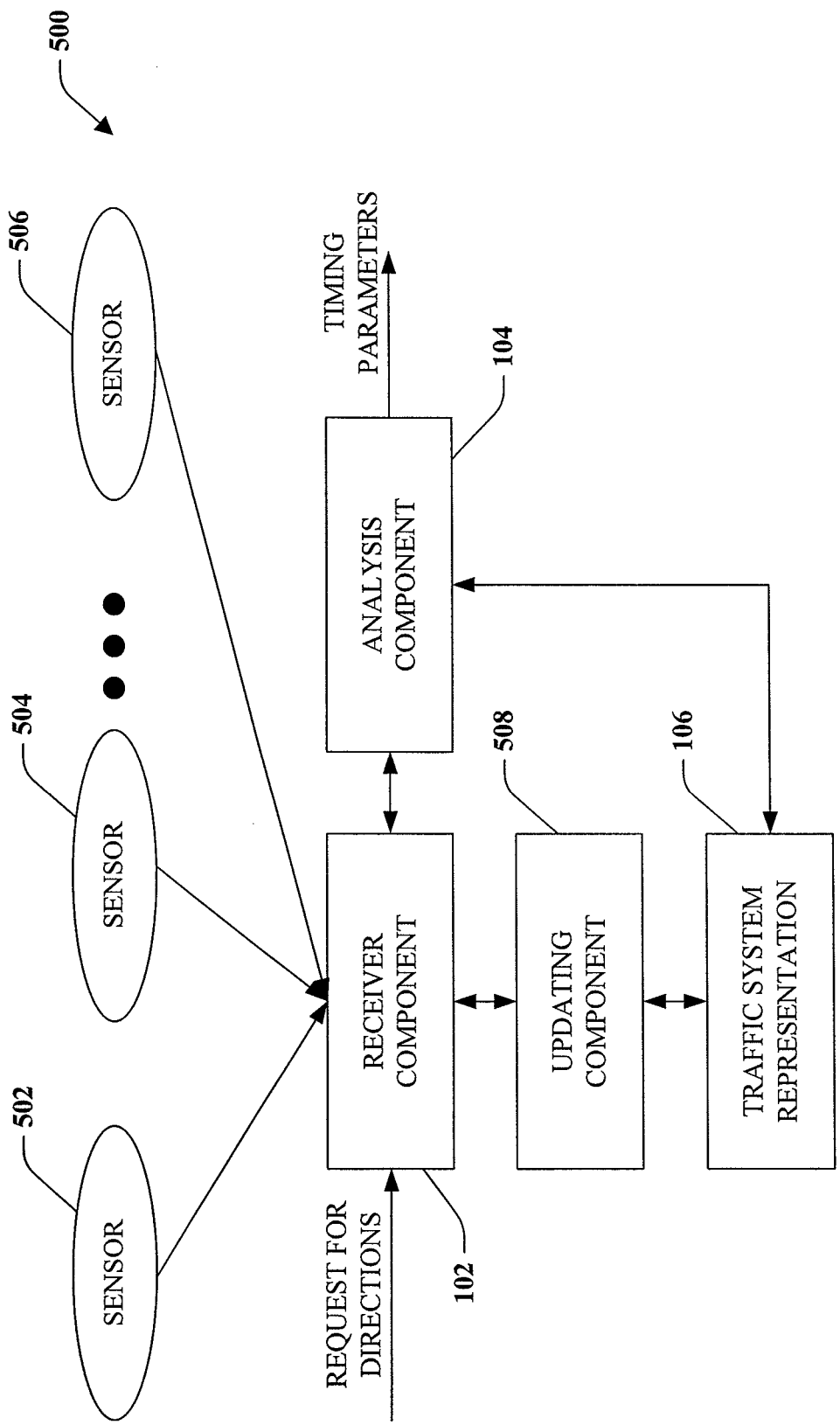
FIG. 5 is a block diagram of a system that facilitates updating a traffic system representation with data collected from one or more sensors.

Turning now to FIG. 5, a route planning system 500 is illustrated. The system 500 includes the receiver component 102 that receives a request for directions, wherein such request includes at least a beginning point and a destination point. The receiver component 102 can additionally be communicatively coupled to a plurality of sensors 502-506 that are utilized to determine a state of a traffic system (or other suitable system where the concepts described herein can be employed). The sensors 502-506 can include pressure sensors within road segments that can be utilized to determine rate of traffic flow and/or number of vehicles within a region. The sensors 502-506 can additionally be associated with web sites that describe traffic events, radio stations that monitor traffic within a region, weather sensors, such as barometers and/or thermometers, a broadcasting station associated with weather, or any other suitable sensor that can be utilized to describe a state of a traffic system. Additionally, the sensors 502-506 can include sensors associated with individual automobiles, such as GPS receivers, speedometers, accelerometers, etc. The receiver component 102 can be configured to continuously receive data from the sensors 502-506 (and not just when the request for directions is received).

Data from the sensors can be provided to an updating component 508, which can be employed to update the traffic system representation 106 based upon the sensed data. For example, traffic systems are not static entities; rather, they are subject to change over time. In particular, construction over certain road segments can cause a traffic system and traffic flows to drastically alter. Similarly, completed construction (e.g., a road changing from a two-lane road to a four-lane road) can cause traffic flows of a road segment (and related road segments) to change. These changes can be reflected within data from the sensors 502-506. The updating component 508 can thereafter update the traffic system representation based at least in part upon the received data. For example, weights associated with edges can be altered given collected data from the sensors 502-506.

The analysis component 104 is communicatively coupled to the receiver component 102, and analyzes the traffic system representation 106 based at least in part upon the received directions. As described above, the analysis component 104 can output timing parameters related to the requested directions. For instance, the analysis component 104 can inform the user of an approximate length of time the journey between the beginning point and the end point will take given various start times. Additionally, the analysis component 104 can output directions between the provided points.

Figure 6:
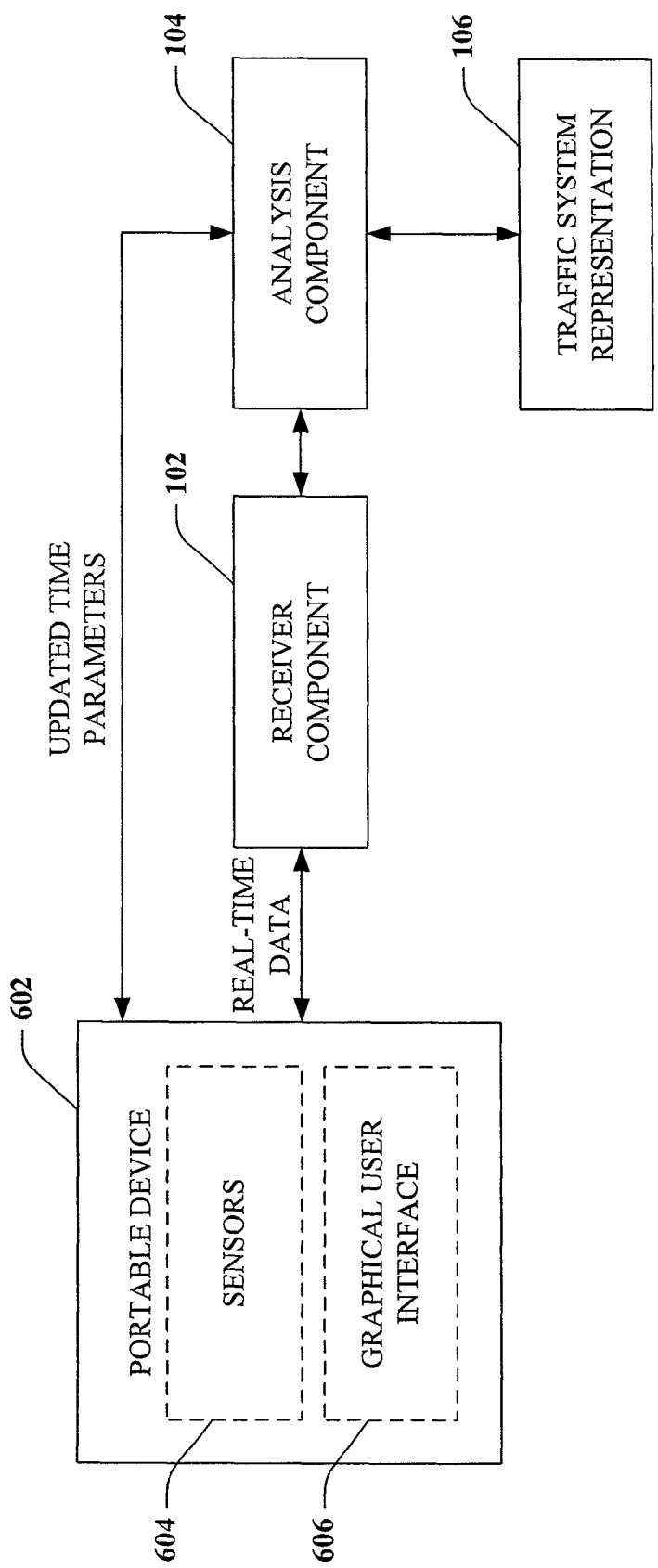
FIG. 6 is a block diagram of a system that facilitates updating remaining travel time between two points based upon sensed parameters associated with the user.

Now referring to FIG. 6, a system 600 that facilitates delivering expected travel times to a portable device is illustrated. The system 600 includes the receiver component 102, which had received a request for directions between two points or a request for estimated travel time along a route. The receiver component 102 may have received the request from a portable device 602 or other suitable device (e.g., a desktop computer). The portable device 602 can be any suitable device that can maintain a connection to a network, such as a personal digital assistant, a smart phone, a cellular phone, a laptop computer, and the like. The receiver component 102, as before, is communicatively coupled to the analysis component 104, which accesses the traffic system representation 106 and outputs estimated time parameters relating to a journey undertaken by a user. As described above, the analysis component 104 can output different estimated travel times for the journey given various start times and contexts (e.g., day of the week, time of the day, . . . ).

The portable device 602 can include sensors 604, which can be location-sensors, speed sensors, or other suitable sensors. With more specificity, the sensors 604 can include a GPS receiver, a speedometer, and an accelerometer. During a journey, data from the sensors 604 within the portable device 602 can be provided to the receiver component 102, which in turn provides such data to the analysis component 104. The analysis component 104 can analyze the traffic system representation 106 in light of the information from the sensors 604, and can provide updated time parameters to the portable device 602. In other words, the analysis component 104 can provide more refined timing parameters while the user is traveling. Pursuant to a specific example, the sensors 604 can include a GPS receiver which indicates that the user is on a certain road segment within a traffic system. This location information can be provided to the analysis component 104, which can access the traffic system representation 106 in view of such location and current context. The analysis component 104 can then update timing parameters associated therewith (e.g., from this point, the journey is expected to take twenty minutes). The portable device 602 can include a graphical user interface 606 that is employed to display the updated timing parameters to a user. Additionally or alternatively, the portable device can output audio that indicates when the journey will be complete.

Figure 7:
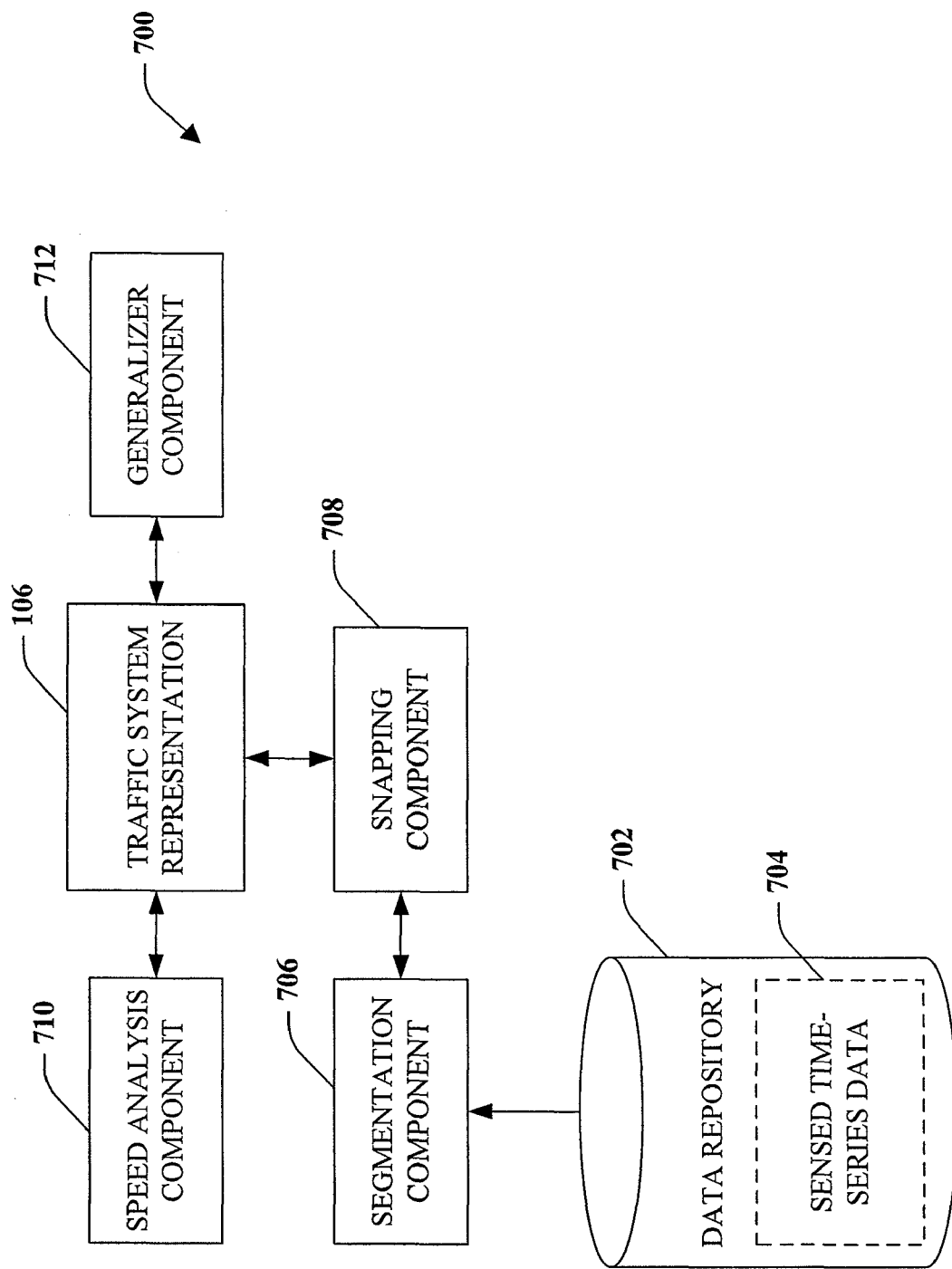
FIG. 7 is a block diagram of a system for building/refining a traffic system representation whose contents alter as context changes.

Referring now to FIG. 7, a system 700 for building a robust traffic system representation is illustrated. The system 700 includes a data repository 702 that includes sensed time-series data 704, wherein such data can be collected from a plurality of drivers as they travel through a traffic system. For example, the sensed time-series data 704 can be obtained by associating location/velocity-determining sensors (such as GPS receivers) with a plurality of drivers in a traffic system (e.g., a metropolitan traffic system). As data is generated from the sensors, such data can be associated with time-stamps. Thus, trace logs for each respective driver associated with the location-determining sensor(s) are generated and can be placed within the sensed time-series data 704. Additionally, the sensors can be configured to record/output data only when a vehicle is in motion, and can automatically cease recording/outputting after the vehicle is immobile for a threshold time and/or when the vehicle is shut off. The sensors can again record/generate data when the vehicle associated therewith begins to travel. A segmentation component 706 can be employed to discern when individual journeys stop and start. As sensors associated with automobiles stop recording when the automobiles stop moving for a threshold amount of time, most (but not all) individual journeys taken by the drivers can be identified by the segmentation component 706 through reviewing time gaps that appear in the sensor logs.

Some situations exist, however, where it may not be easy to discern where a journey started and stopped. For example, a driver may stop for a short period of time to drop off a passenger. To locate such situations, for instance, the segmentation component 706 can analyze logs within the sensed time-series data to determine when a loop has been made (e.g., from location A to location B to location A). If the segmentation component 706 detects a loop, then a segmentation point can be chosen at a point in the loop that is physically furthest from where the loop closes.

The traffic system representation 106 can be built/defined based at least in part upon the sensed time-series data 704, and can be or include a graph, where nodes in the graph represent intersection of roads and edges represent road segments. A single road may be represented by multiple edges, as each road segment (the smallest unbroken portion of a road between two intersections) can be a separate edge in the graph. Additionally, the edges and nodes can be associated with latitudes and longitudes of roads that they represent. Once the sensed time-series data 704 has been segmented into individual journeys, such journeys can be "snapped" to the traffic system representation 106 through any suitable manner.

Once the trace logs are mapped into road segments, a speed analysis component 710 can associate different weights to edges/nodes within the graph of the traffic system representation 106 over different times. For example, the speed analysis component 710 can learn time-dependent traffic speed for roads by breaking days of the week into multiple categories and breaking such categories into several time slices. For purposes of illustration, it can be assumed that the speed analysis component 710 breaks the days of the week into two categories: weekdays and weekends. Such categories can then be broken into 96 time slices: 15-minute blocks of time covering 24 hours of the day. It is understood, however, that the speed analysis component 710 can create categories associated with any sort of contextual data. For instance, the speed analysis component 710 can create categories based upon weather conditions, holidays, and the like.

Continuing with the above example, the speed analysis component 710 can learn a separate average speed for each time-of-day and weekday/weekend breakdown by examining each pair (A, B) of consecutive GPS points in snapped traces. The average speed of a driver between each pair can be calculated, and the speed can be utilized to create a running average for every road segment traversed to get from A to B. Speed measurements can be applied to the running average associated with a block of time whose time characteristics match those of timestamps of collected data involved in the speed calculation. Thus, the speed analysis component 710 can determine speeds associated with road segments in various categories (time of day, day of week, . . . ). The speed analysis component 710 can then associate such data with the traffic system representation 106, such that edges and nodes are weighted based upon the collected data.

It can be discerned, however, that it may be impossible to obtain data for every road in a traffic system over every category. Thus, road speeds can be generalized given known road speeds of "similar" road segments. In more detail, a generalizer component 712 can analyze the traffic system representation 106 and provide speed values to road segments that are not associated with collected data for each category. For instance, for road segments and time segments where no data is available, the generalizer component 712 can assign the speed that is associated with the same road segment at an adjacent time block. If there is no speed associated with an adjacent time block, the generalizer component 712 can assign the segment a speed from a similar road and/or a system-wide average of speeds from similar roads, where similarity can be defined by road class within the traffic system representation 106. Additionally, similarity can be determined by analyzing speed limits, geographic proximity of road segments, geographic location of road segments, and the like. Still further, if similar roads cannot be located and/or if a system-wide speed average is unavailable, the speed for a time segment can be defined as the posted speed limit. Moreover, the generalizer component 712 can utilize machine-learning techniques/systems to learn patterns/correlations within the traffic system representation 106 and assign average road speeds to road segments based at least in part upon learned patterns, correlations, and/or trends.

Figure 8:
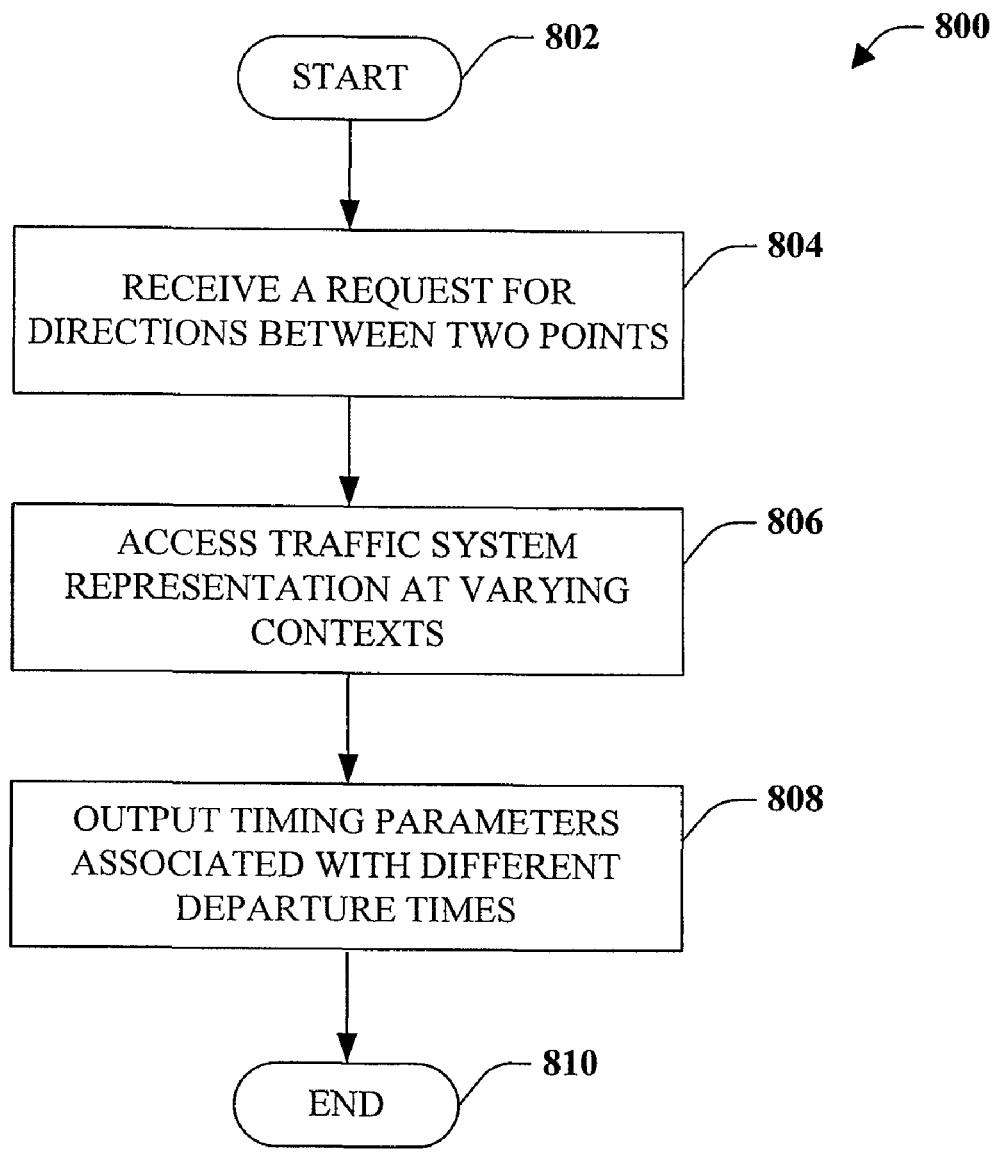
FIG. 8 is a representative flow diagram of a methodology for outputting estimated travel times between two points given different departure times.
Figure 9:
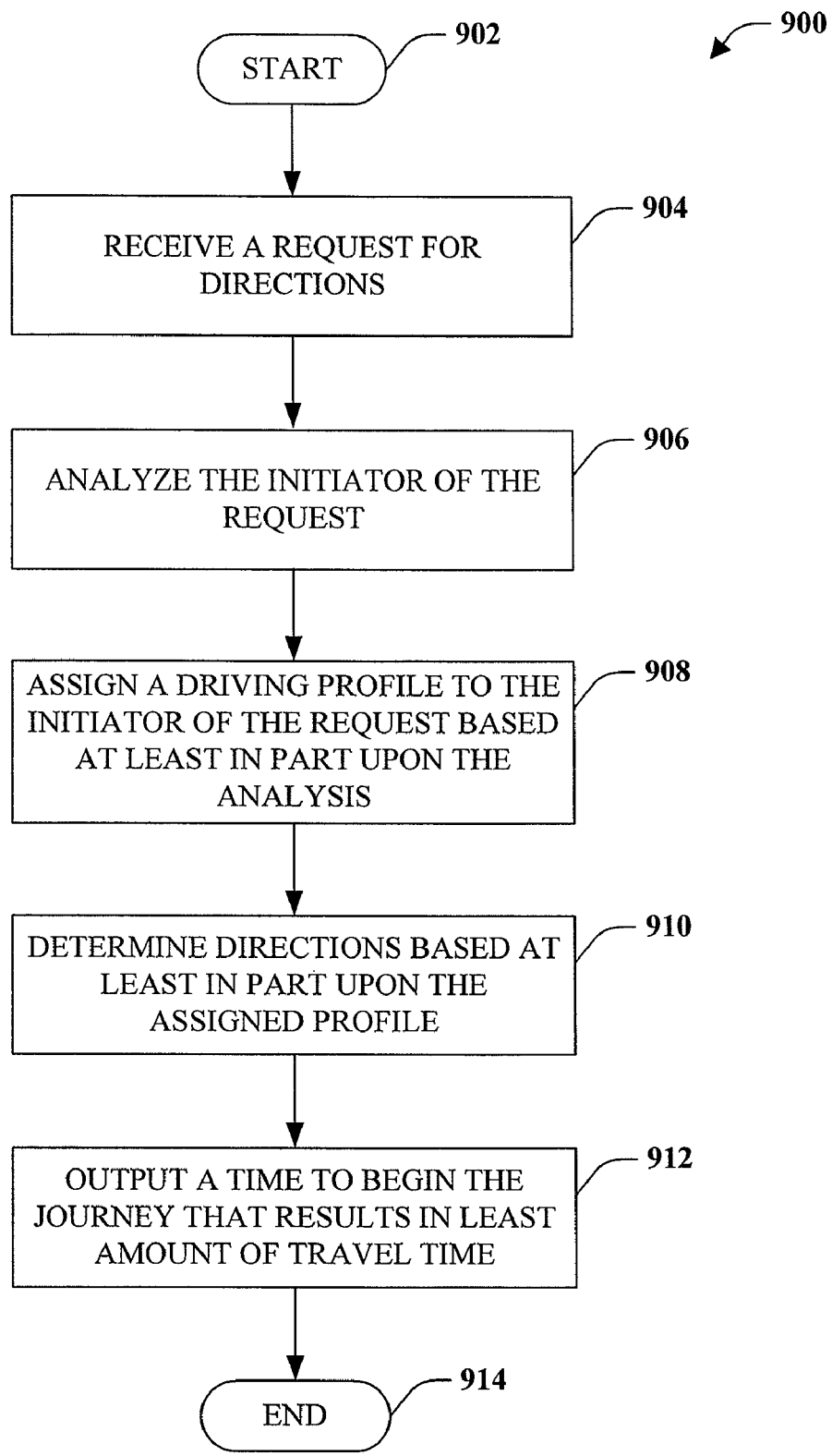
FIG. 9 is a representative flow diagram of a methodology for determining when to begin a journey to minimize estimated travel time.
Figure 10:
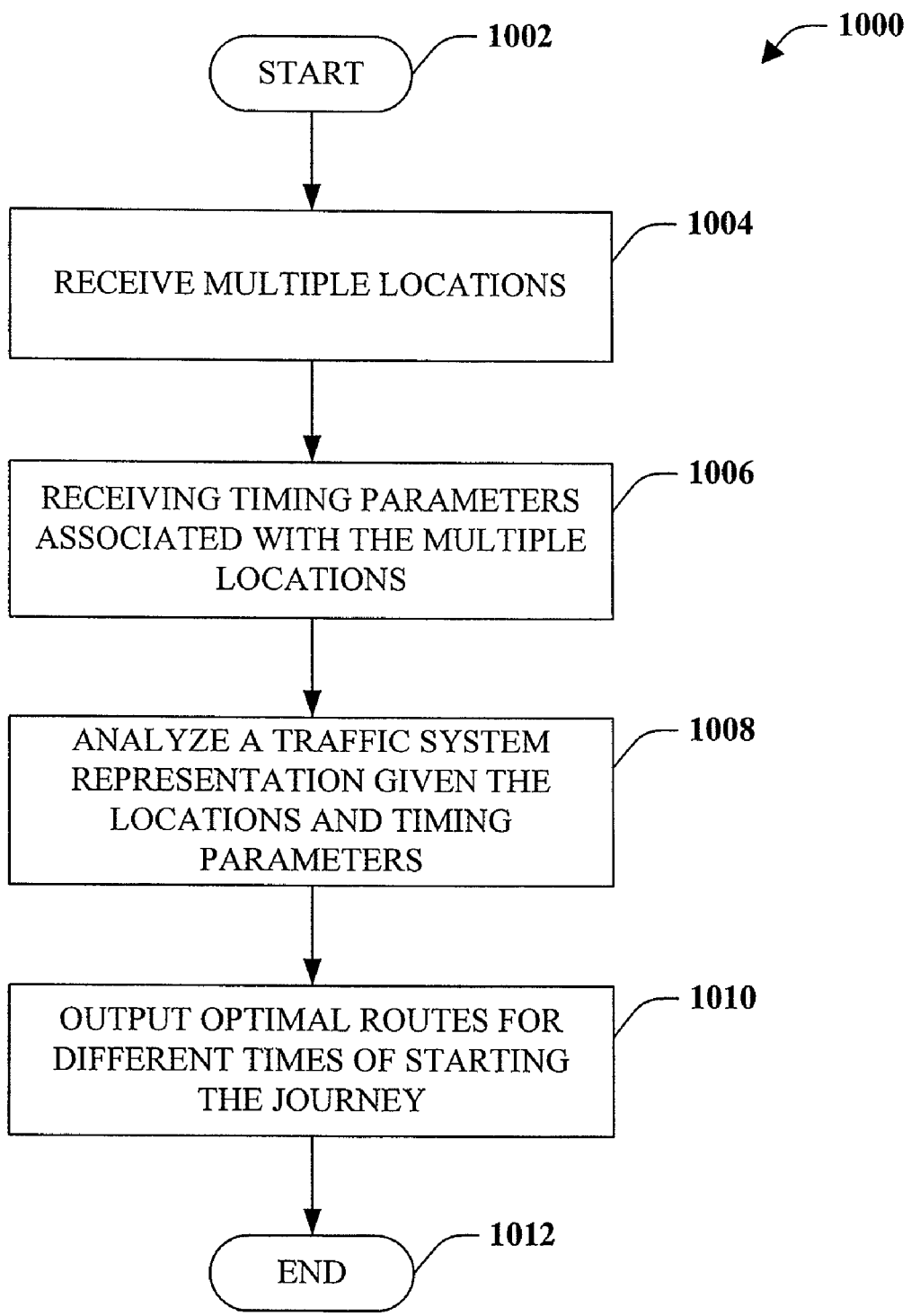
FIG. 10 is a representative flow diagram of a methodology for outputting different directions between two points for different departure times.

Referring now to FIGS. 8-10, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring specifically to FIG. 8, a methodology 800 for outputting timing parameters associated with a route is illustrated. The methodology 800 starts at 802, and at 804 a request for directions between two points is received. For instance, the request can be received over a network such as the Internet through employment of a web browser. Any suitable manner for receiving the request, however, is contemplated and intended to fall under the scope of the hereto-appended claims.

At 806, a traffic system representation is accessed at varying contexts. More particularly, the traffic system representation can be or include a weighted graph that represents a traffic system, where nodes represent intersections and edges represent road segments between the intersections. The nodes and/or edges can be weighted based at least in part upon expected travel time associated with the intersections/road segments that the nodes and edges represent. Moreover, the weights can change as context alters. Thus, for instance, a weight for a road segment at 8:00 a.m. on a Friday may be quite different from a weight of a road segment at noon on a Saturday. Different weighting over different contexts represents traffic flows in a traffic system, which can drastically alter with different contexts. Pursuant to one example, the traffic system representation can be accessed at various time contexts. At 708, timing parameters associated with different departure times with respect to a route that accords to the request for directions are output. Pursuant to an example, the timing parameters can include how long travel can be expected to take if travel is begun at various times (e.g., if started now, the journey will take two hours, if started in an hour, the journey will take two and a half hours, . . . ). The methodology 800 then completes at 810.

Now turning to FIG. 9, a methodology 900 for determining when a journey should be initiated to result in minimal travel time is illustrated. The methodology 900 starts at 902, and at 904 a request for directions is received. At 906, the initiator of the request is analyzed. For example, driving habits of the initiator of the request can be determined by analyzing collected data relating to travel of the initiator of the request. For example, such user's automobile can be associated with a GPS receiver, such that location data, speed data, and the like can be collected and analyzed with respect to the user. Furthermore, demographic information associated with the user can be analyzed. At 908, a driving profile is assigned to the initiator of the request based at least in part upon the analysis. For example, several profiles can be created and defined that adequately represent detailed driving preferences of a subset of the general driving population. For example, a profile can represent drivers who are willing to extend their journey to avoid merges onto busy freeways.

At 910, directions are determined based at least in part upon the assigned profile. Thus, continuing with the above example, the driving directions will not include a merge onto a busy freeway, even if such merge would result in the least amount of travel time. At 912, a time to begin the journey that would result in a least amount of travel time is output. While shown as separate acts, the acts 910 and 912 can occur in conjunction. For example, directions can depend upon what time the user will travel, while an optimal time to begin a journey is dependent upon the selected route. Furthermore, the optimal time to begin a journey can be confined to a particular window of time. For instance, driving at 3:00 a.m. may result in a fastest journey; however, the user may wish to be sleeping at such time. Therefore, for example, a time window of between 8:00 a.m. and noon can be provided. The output time to begin the journey (and directions for the journey) can then be confined within the time window. The methodology 900 ends at 914.

Turning now to FIG. 10, a methodology 1000 for outputting different optimal routes for different start-times of a journey is illustrated. The methodology 1000 starts at 1002, and at 1004 multiple locations are received. The multiple locations can include a beginning and ending point, wherein the beginning and ending point may be the same geographic point. Pursuant to an example, the multiple locations can relate to errands that are desirably run, such as a trip to the post office, the grocery store, a school, a clothing store, etc. At 1006, timing parameters associated with the multiple locations are received. For instance, the timing parameters can include operating hours of businesses or stores as well as an amount of time that the user expects to reside at the received locations. Continuing with the above example, the user can indicate that the post office will take approximately ten minutes, the grocery store will take approximately an hour, the school will take approximately thirty minutes, and the clothing store will take approximately forty five minutes.

At 1008, a traffic system representation is analyzed given the locations and timing parameters. As described above, the traffic system representation can include or be a weighted graph that comprises representations of intersections and road segments. These representations can be weighted according to expected travel time associated therewith, and the weights can change as time of day, day of week, weather conditions, and the like alter. At 1010, optimal routes for different times of starting the journey can be output to the user. For instance, if the journey is begun at 10:00 a.m., it may be optimal to visit the clothing store first, followed by the grocery, followed by the post office, and finally followed by the school. Moreover, an estimated time for undertaking the entire journey can be provided to the user. If, however, the journey is begun at noon, it may be optimal to visit the post office first, followed by the grocery, followed by the school, and finally followed by the clothing store. These start times for the journey and estimated time for completing the journey can greatly aid a user in planning for trips and/or running errands. The methodology 1000 then ends at 1012.

Figure 11:
FIGS. 11 and 12 are screenshots illustrating collection of data from automobiles in a traffic system.
Figure 12:
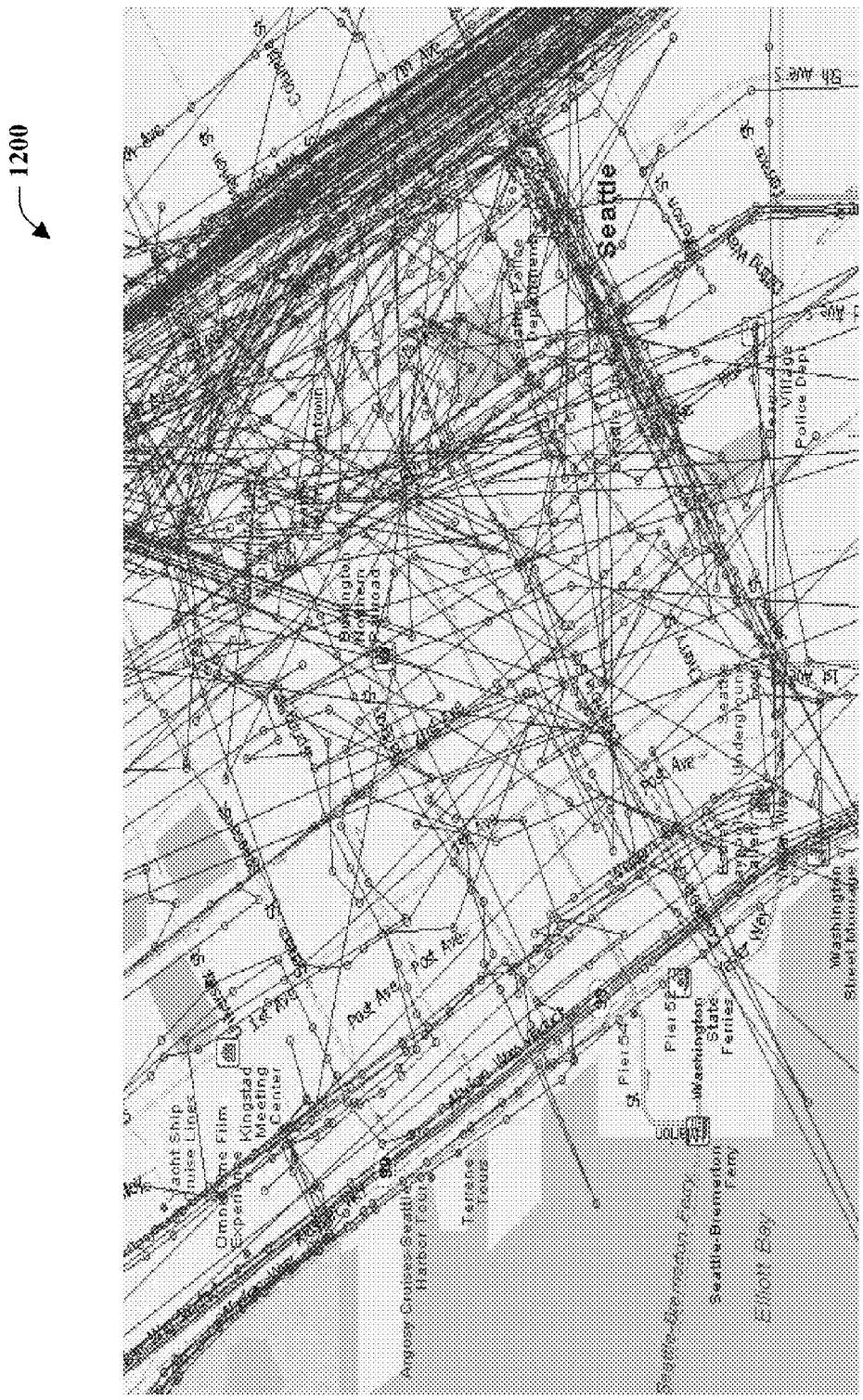

Referring collectively to FIGS. 11 and 12, screenshots 1100 and 1200 of a map overlaid with data points associated with location-sensors in automobiles is illustrated. The screenshot 1100 shows a high-level view of a metropolitan area where data has been collected, and the screenshot 1200 includes a more detailed illustration of collected data points overlaying a map. These data points can be associated with a plurality of different drivers over time. It can also be discerned upon viewing the screenshot 1200 that the data points often do not map to roadways, even though most of such data points were taken from vehicles on such roadways. Therefore, it is important to carefully "snap" these data points to roadways to enable creation of a robust traffic flow representation over different contexts. In one example, a Hidden Markov Model can be utilized in connection with snapping data points to associated road segments.

Figure 13:
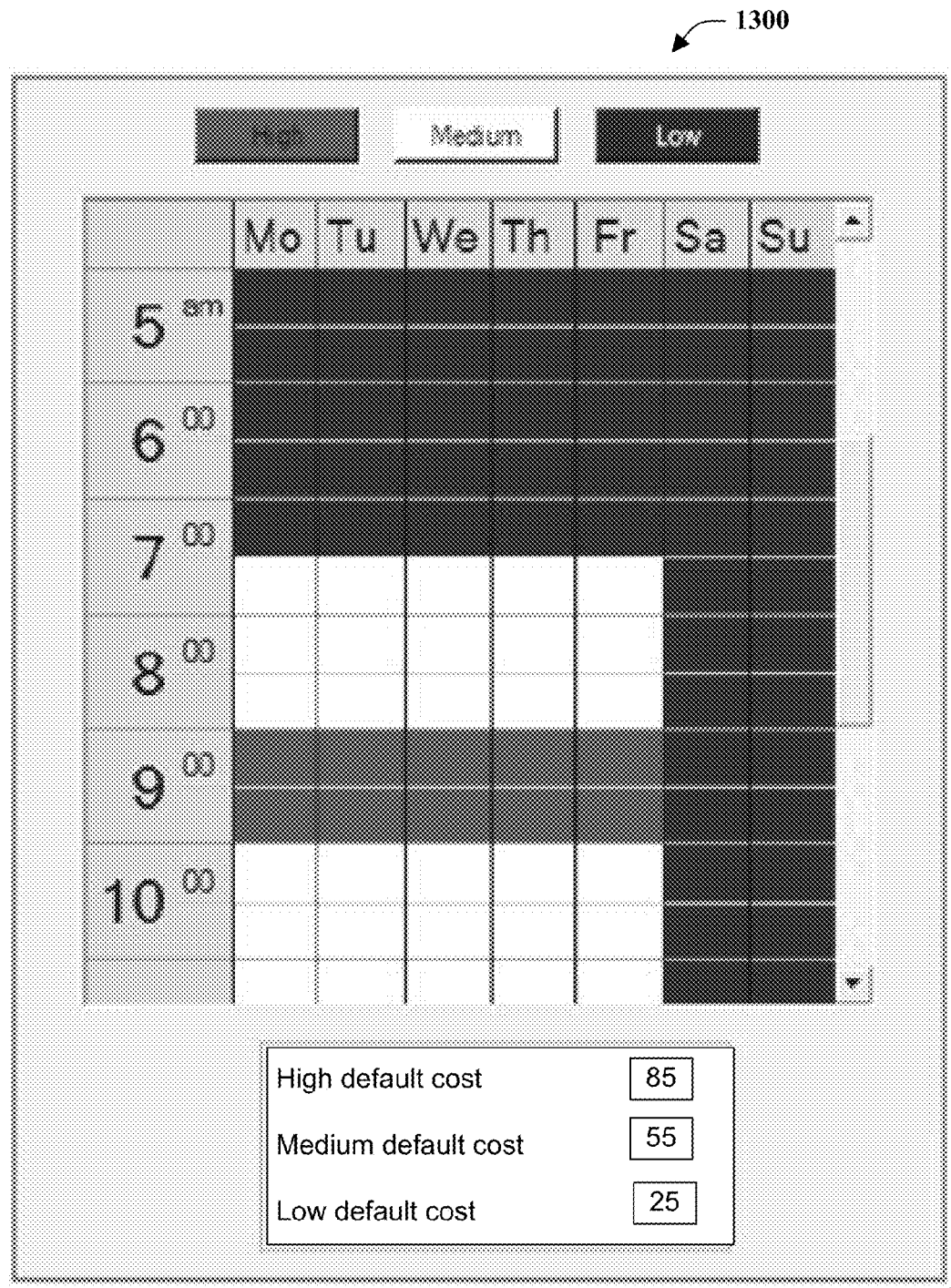
FIG. 13 is an example cost-of-time assessment palette.

FIG. 13 illustrates a 24/7 cost-of-time assessment palette 1300, allowing users to sweep out regions of low, medium, and high background costs of time, by time of day and day of week, and to associate a dollars per hour rate with each state. Thus, users can value their time, and such valuation can be input into the analysis component 104 (FIG. 1), for example, to enable determination of an optimal route. As an example, users can be asked to assign costs for being late to appointments, valuation for time while driving, social and coordinative costs of being late for a meeting: users can be allowed to enter a tardy penalty, a dollar value representing what users would be willing to pay to avoid being late, and a lateness fee, the additional cost of time for each minute they are late after that. Beyond considering appointment versus no appointment situations, a facility for splitting out meetings by calendar properties can be provided, allowing users to assign different tardy penalties and lateness fees to different kinds of meetings when requesting directions between two points. After assessment of default and meeting-centric time costs and penalties, a database of costs can be updated by time to a server, and such costs can be used in performing cost analysis during opportunistic planning. Such penalties and costs can be employed by the analysis component 104 (FIG. 1) in connection with outputting a route to a user.

With respect to learning predictive models for the cost of time, such models can introduce richer sophistication to the reasoning of a system that provides directions that are sensitive with respect to certain contexts, allowing the system to automatically assign costs of being late for different events based on the structure of appointments on a users' online calendar. In the machine learning effort, models can be built that infer (1) the probability that an appointment is associated with a low, medium, or high cost of being tardy, and (2) the probability that an appointment on a user's calendar is a valid deadline, based on multiple factors.

Figure 14:
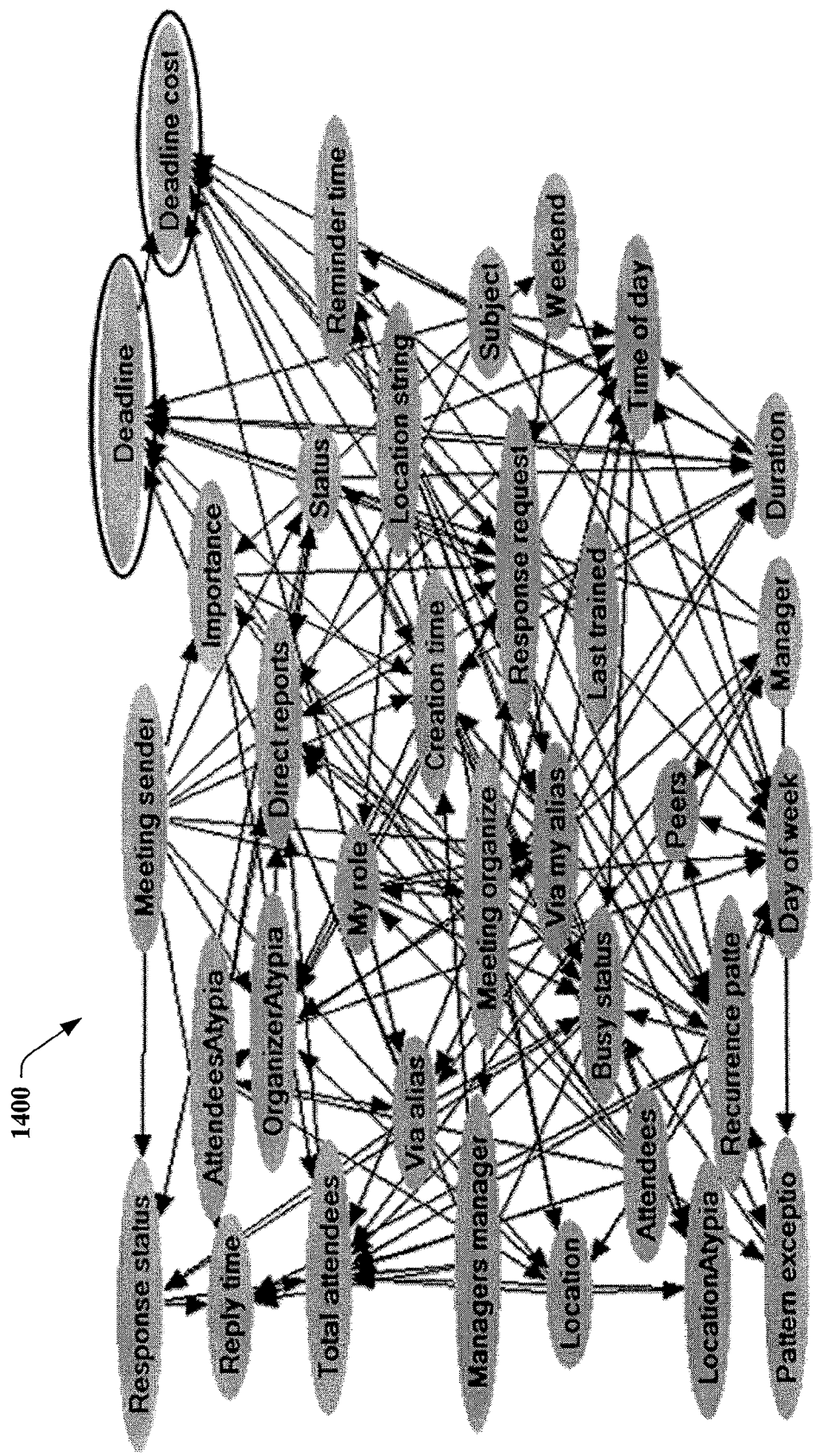
FIG. 14 is an example Bayesian model that can be utilized to determine costs associated with a user's time.

FIG. 14 illustrates a Bayesian network model 2400 learned from a case library of tagged appointments. The model 2400 predicts the likelihood that appointments start times are genuine deadlines for meetings and for predicting the cost function associated with tardiness. Target variables for the association of a deadline with the start of an appointment and the cost of being delayed are highlighted as circled nodes. Such a model 2400 can be useful in determining costs of being late to a particular appointment, and a system that outputs driving directions based upon context can generate routes and start times for such routes based upon the determined costs.

Figure 15:
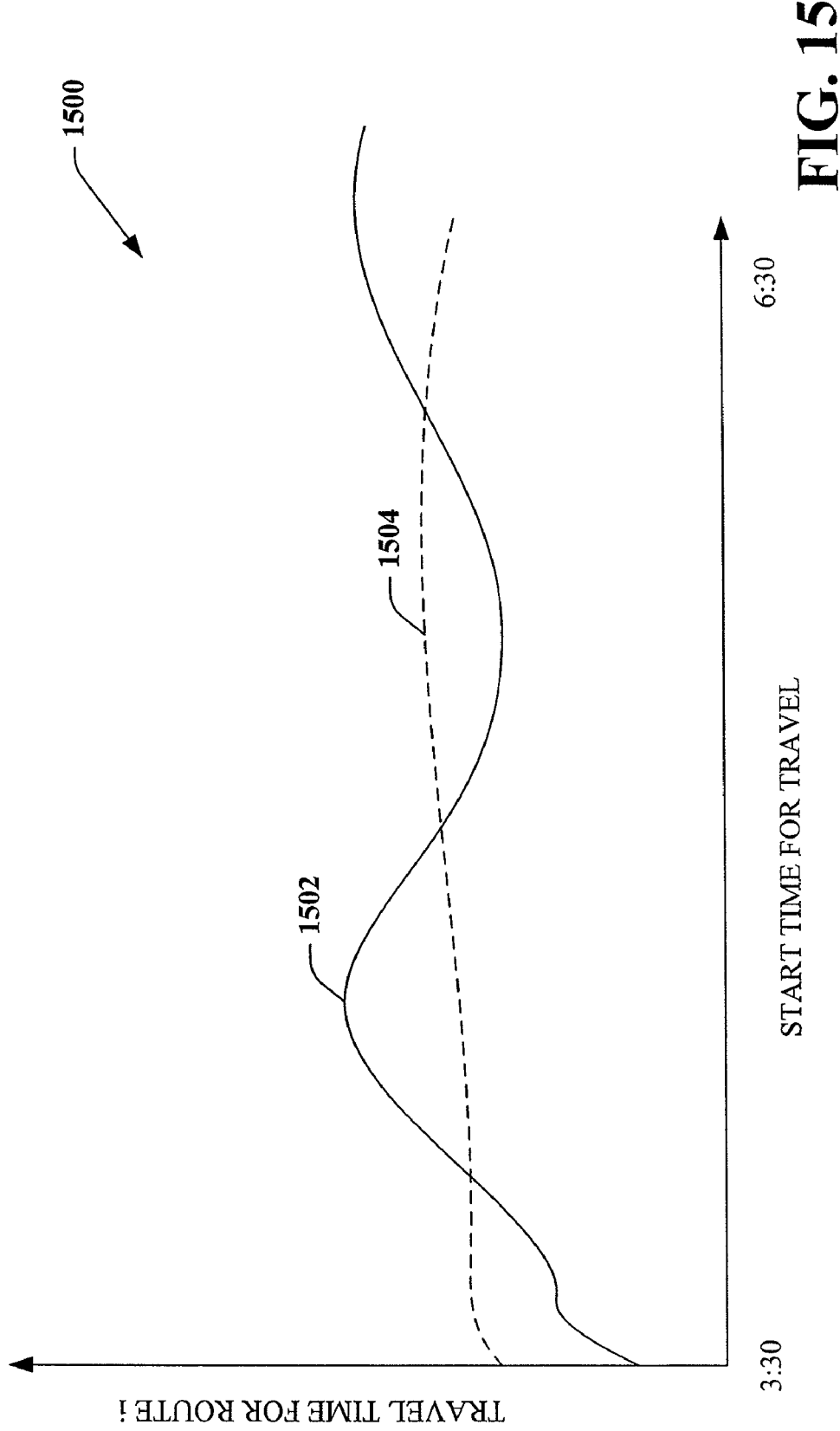
FIG. 15 is an example graph that illustrates travel start times and expected travel times with respect to multiple routes.

Turning now to FIG. 15, a graph 1500 illustrating travel times for different routes given different starting times for travel is illustrated. The graph 1500 includes a line 1502 that is representative of a first route and a line 1504 that is representative of a second route 1506. As can be discerned, travel time associated with the second route is not as volatile with respect to different start times for travel as the first route. However, to minimize an amount of driving time, the traveler may desire to travel over the first route (if able to depart at 3:30). The systems/methods described herein can inform a user when to leave if they are unconstrained with respect to departure time, which route to take if they have a constrained departure time, what route to take at what times given certain preferences (willingness to risk sitting in traffic versus being averse to such risk), etc.

Figure 16:
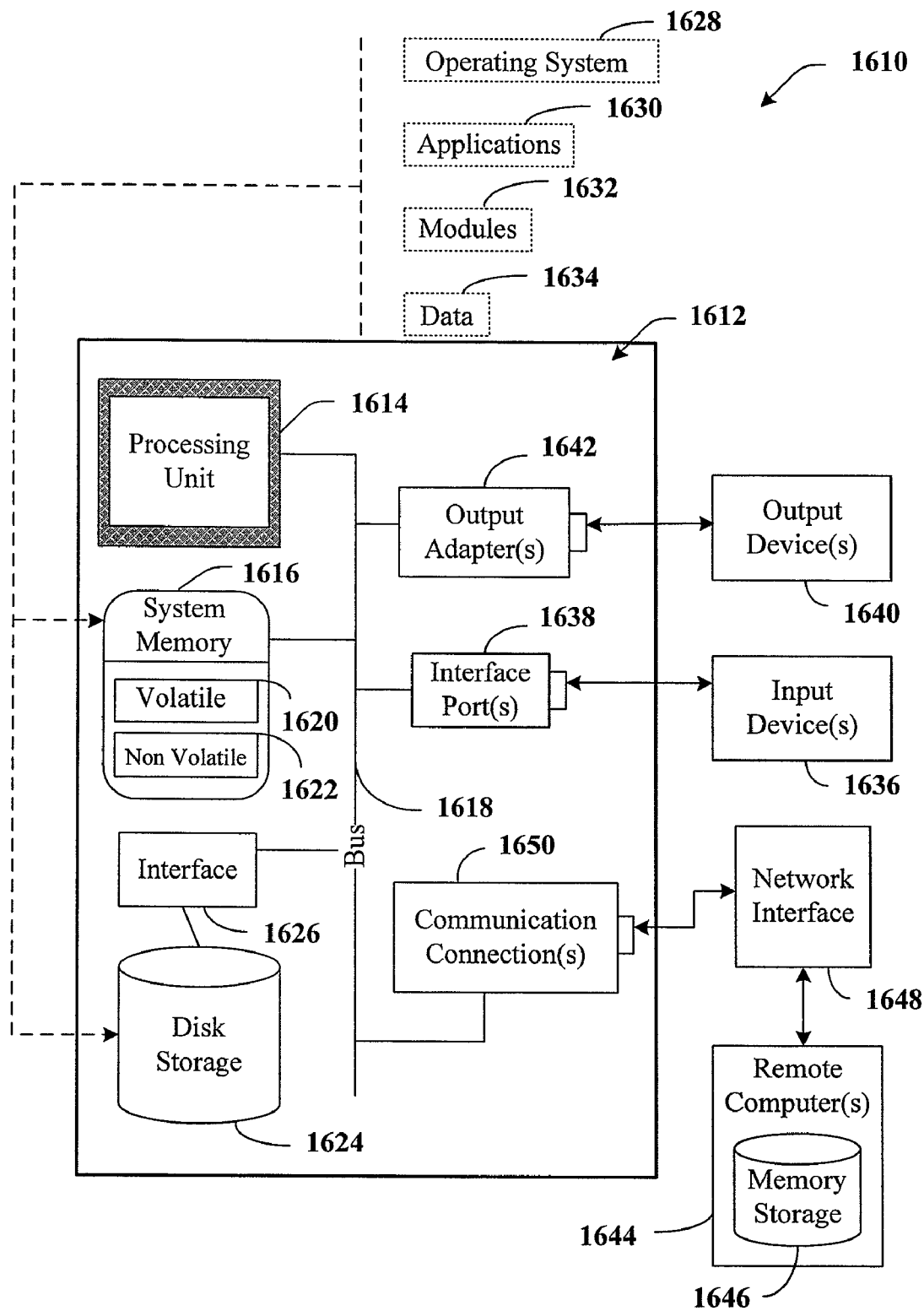
FIG. 16 is a schematic block diagram illustrating a suitable operating environment.

In order to provide additional context for various aspects of the claimed subject matter, FIG. 16 and the following discussion are intended to provide a brief, general description of a suitable operating environment 1610 in which various aspects may be implemented. While the claimed subject matter is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1610 is only one example of a suitable operating environment and is not intended to suggest any limitation as to the scope of use or functionality of the features described herein. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 16, an exemplary environment 1610 that can be employed in connection with determining timing parameters related to a route output by a route planning application includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI). The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/nonremovable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). For instance, a DVD-ROM drive can be employed in connection with reading video content from a DVD. To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the subject invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, remote control, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

Figure 17:
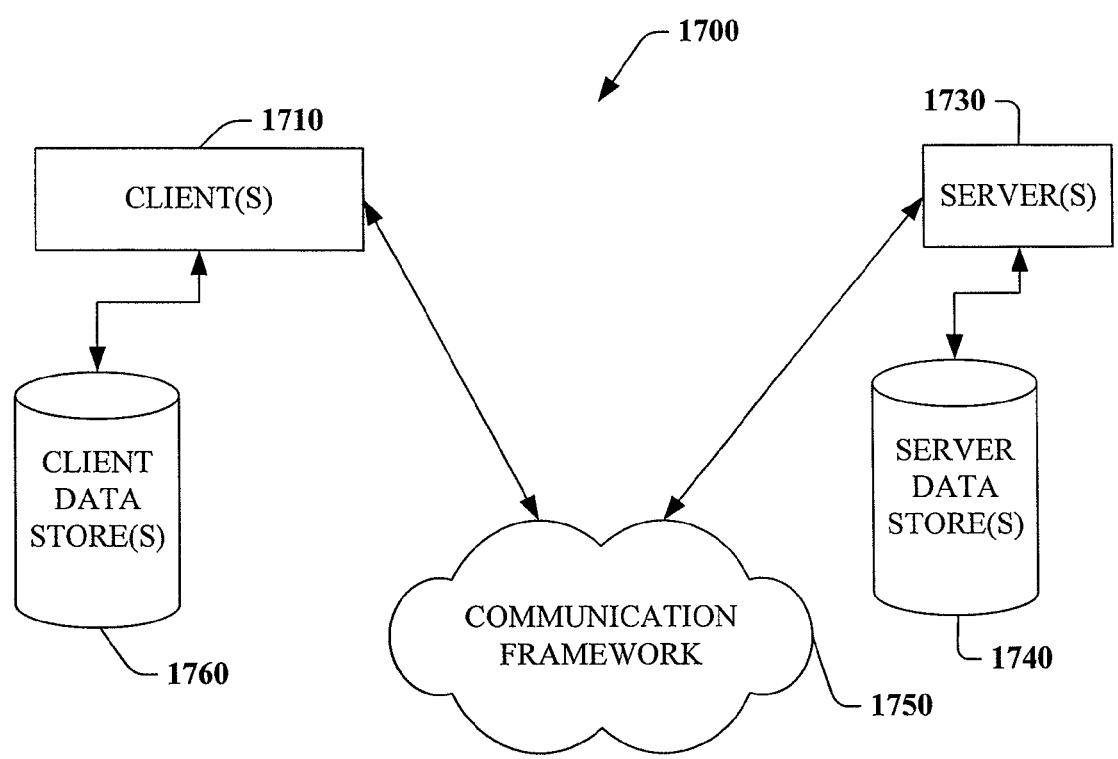
FIG. 17 is a schematic block diagram of a sample-computing environment.

FIG. 17 is a schematic block diagram of a sample-computing environment 1700 with which the claimed subject matter can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The servers 1730 can house threads to perform transformations by employing the claimed subject matter, for example. One possible communication between a client 1710 and a server 1730 can be in the form of a data packet adapted to be transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the server(s) 1730. In one particular example, the server(s) can include a route planning system that is accessible to a client by way of a network. Users can request driving directions from the route planning system by submitting a request to the route planning system within the server by way of the client and the network, and the route planning system can then output resultant driving directions to the client. The route planning system can additionally output timing parameters associated with such route.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of identifying a route for travel, the method comprising:

with at least one processor:

receiving a request for directions for a user to travel between a beginning point and a destination point;

accessing user preferences, the user preferences comprising preferences of the user about a probability of arriving within a time window;

searching for at least one candidate route between the beginning point and the destination point, the searching being based at least in part upon at least one of sensed and inferred contextual information, each of the at least one candidate routes having a start time associated therewith; and selecting at least one of the at least one candidate routes to provide to the user, the selected at least one of the at least one candidate routes being selected based at least in part upon the user preferences.

2. The method of claim 1, further comprising:

analyzing the at least one of the sensed and inferred contextual information;

predicting traffic flows at road segments at future times based at least in part upon the analysis; and outputting the one or more routes based at least in part upon the predicted traffic flows.

3. The method of claim 1, wherein:

the method further comprises computing, for each of the at least one candidate routes, a value of an estimated utility metric based on the user preferences; and selecting at least one of the at least one candidate routes comprises selecting based on the respective value of the estimated utility metric computed for each of the at least one candidate routes.

4. The method of claim 1, further comprising:

determining an expected cost of a journey; and outputting a route and a journey start time between the beginning point and the destination point based at least in part upon the expected cost.

5. The method of claim 1, further comprising recommending to the user to perform a task prior to one of beginning a journey and continuing a journey.

6. The method of claim 1, wherein:

the at least one of sensed and inferred contextual information comprises one or more of observed and predicted traffic flows; and the method further comprises alerting the user with respect to when to begin travel between the beginning point and the destination point based on the start time associated with the selected at least one of the at least one candidate routes.

7. The method of claim 6, wherein the alerting comprises triggering an alarm clock to generate an alarm at a time based on the start time associated with the selected at least one of the at least one candidate routes.

8. The method of claim 1, the user preferences further comprising preferences of the user about a route.

9. The method of claim 8, wherein the user preferences are obtained by at least one of analyzing data collected from sensors, analyzing responses of the user to a questionnaire, and predicting preferences based on demographics of the user.

10. A system to facilitate providing a route for travel, comprising:

a processor;

a memory communicatively coupled to the processor, the memory having stored therein computer-executable instructions configured to implement the route travel system including:

a receiver component for receiving a request for directions for a user to travel between a beginning point and a destination point, and user inputs, the user inputs indicating a preference of the user regarding an amount of time between a target arrival time and a scheduled start time of an event; and an analysis component for:

searching for at least one candidate route between the beginning point and the destination point, the searching being based at least in part upon at least one of sensed and inferred contextual information, and selecting at least one of the at least one candidate routes to provide to the user, the selected at least one of the at least one candidate routes being selected based at least in part upon the user inputs.

11. A method of operating a system that provides a route for travel, the method comprising:

with at least one processor:

receiving a request for directions for a user to travel between a beginning point and a destination point;

receiving user inputs, the user inputs indicating a preference of the user of arriving at a destination before a scheduled start time of an event or a preference of the user of arriving at a destination after the scheduled start time of the event, and a preference of the user regarding an amount of time between a target arrival time and the scheduled start time of the event;

searching for at least one candidate route between the beginning point and the destination point, the searching being based at least in part upon at least one of sensed and inferred contextual information; and selecting at least one of the at least one candidate routes to provide to the user, the selected at least one of the at least one candidate routes being selected based at least in part upon the user inputs.

12. The method of claim 11, wherein:

the method further comprises:

receiving an input indicating the target arrival time;

accessing historical data; and based at least in part on the historical data, computing for each of the at least one candidate routes, a scheduled arrival time and a probability of arrival by the scheduled arrival time; and selecting at least one of the at least one candidate routes comprises selecting a candidate route based at least in part on the candidate route having a scheduled arrival time and a probability of arrival by the scheduled arrival time consistent with the user inputs.

13. The method of claim 12, wherein receiving user inputs comprises receiving user inputs describing a cost to the user of arrival at times relative to a start of a meeting or appointment.

14. The method of claim 12, wherein receiving user inputs comprises receiving user inputs indicating a minimum probability of arriving at a specified time.

15. The method of claim 11, wherein the preference of the user regarding the amount of time between the target arrival time and the scheduled start time of the event is expressed probabilistically.

16. The method of claim 11, the user inputs further indicating a preference of the user regarding a departure time.

17. The method of claim 11, the user inputs further indicating a preference of the user regarding a travel duration.

18. The method of claim 11, the user inputs further indicating a preference of the user regarding a willingness to risk becoming stuck in non-moving traffic.

* * * * *